(12) United States Patent
Chung et al.

(10) Patent No.: US 11,937,267 B2
(45) Date of Patent: *Mar. 19, 2024

(54) METHOD AND DEVICE FOR DYNAMICALLY INDICATING SPATIAL PARAMETERS IN WIRELESS COMMUNICATION SYSTEM

(71) Applicant: LG ELECTRONICS INC., Seoul (KR)

(72) Inventors: Jaehoon Chung, Seoul (KR); Jiwon Kang, Seoul (KR); Seongwon Go, Seoul (KR); Kyuseok Kim, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,935

(22) Filed: Aug. 7, 2023

(65) Prior Publication Data
US 2023/0397217 A1    Dec. 7, 2023

Related U.S. Application Data

(63) Continuation of application No. 17/992,488, filed on Nov. 22, 2022, now Pat. No. 11,778,637, which is a (Continued)

(30) Foreign Application Priority Data

Nov. 4, 2020   (KR) .......................... 10-2020-0146337

(51) Int. Cl.
*H04W 72/23*    (2023.01)
*H04L 1/1812*   (2023.01)

(52) U.S. Cl.
CPC .......... *H04W 72/23* (2023.01); *H04L 1/1812* (2013.01)

(58) Field of Classification Search
CPC ........................... H04W 72/23; H04L 1/1812
See application file for complete search history.

(56) References Cited

U.S. PATENT DOCUMENTS

2020/0053776 A1*  2/2020  John Wilson ..... H04W 74/0808
2021/0091900 A1*  3/2021  Zhang .................. H04W 72/20
(Continued)

*Primary Examiner* — Chi Ho A Lee
(74) *Attorney, Agent, or Firm* — LEE, HONG, DEGERMAN, KANG & WAIMEY

(57) ABSTRACT

Disclosed are a method and a device for dynamically indicating and applying spatial parameters in a wireless communication system. A method for applying spatial parameters by means of a terminal in a wireless communication system, according to one embodiment of the present disclosure, comprises the steps of: receiving, from a base station, downlink control information (DCI) including first information on one or more spatial parameters, second information on time domain resource allocation, and third information on whether to schedule a data channel; transmitting, on the basis of the second information, hybrid automatic repeat request-acknowledgement (HARQ-ACK) information to the base station on the basis of the third information indicating that the data channel is not scheduled; and after transmitting the HARQ-ACK information, performing uplink transmission to the base station or downlink reception from the base station on the basis of the one or more spatial parameters based on the first information.

10 Claims, 17 Drawing Sheets

Related U.S. Application Data continuation of application No. PCT/KR2021/015853, filed on Nov. 4, 2021.

(56) References Cited

U.S. PATENT DOCUMENTS

| | | | |
|---|---|---|---|
| 2021/0314954 A1* | 10/2021 | Miao | H04W 16/28 |
| 2021/0377989 A1* | 12/2021 | Chae | H04B 7/06954 |
| 2022/0058082 A1* | 2/2022 | Ama | G06F 1/28 |
| 2022/0061056 A1* | 2/2022 | Farag | H04W 72/23 |
| 2022/0103325 A1* | 3/2022 | Chen | H04L 5/0023 |
| 2022/0132543 A1* | 4/2022 | Bai | H04W 72/02 |
| 2022/0201757 A1* | 6/2022 | Cruz | H04L 5/0053 |
| 2022/0345909 A1* | 10/2022 | Song | H04W 72/23 |

* cited by examiner (a)          (b)

METHOD AND DEVICE FOR DYNAMICALLY INDICATING SPATIAL PARAMETERS IN WIRELESS COMMUNICATION SYSTEM

CROSS-REFERENCE TO RELATED APPLICATIONS

This application is a continuation of U.S. patent application Ser. No. 17/992,488, filed on Nov. 22, 2022, now U.S. Pat. No. 11,778,637, which is a continuation of International Application No. PCT/KR2021/015853, filed on Nov. 4, 2021, which claims the benefit of earlier filing date and right of priority to Korean Patent Application No. 10-2020-0146337, filed on Nov. 4, 2020, the contents of all of which are hereby incorporated by reference herein in their entireties.

TECHNICAL FIELD

The present disclosure relates to a wireless communication system, and more particularly, to a method and apparatus for dynamically indicating a spatial parameter in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for dynamic indication of a spatial parameter by a base station to a terminal, and for dynamic application of the indicated spatial parameter by a terminal in a wireless communication system.

An additional technical object of the present disclosure is to provide a method and an apparatus for dynamic indication and application of a spatial parameter without a scheduling of data transmission or reception in a wireless communication system.

An additional technical object of the present disclosure is to provide a method and an apparatus for minimizing an overhead and a delay of indication and application of a spatial parameter in a wireless communication system.

The technical objects to be achieved by the present disclosure are not limited to the above-described technical objects, and other technical objects which are not described herein will be clearly understood by those skilled in the pertinent art from the following description.

According to an aspect of the present disclosure, a method of applying a spatial parameter by a terminal in a wireless communication system may comprise: receiving, from a base station, downlink control information (DCI) including first information related to at least one spatial parameter, second information related to time domain resource allocation, and third information related to whether data channel being scheduled; transmitting, to the base station, hybrid automatic repeat request-acknowledgement (HARQ-ACK) information based on the second information, based on the third information indicating the data channel not being scheduled; and performing an uplink transmission to the base station or a downlink reception from the base station based on the at least one spatial parameter based on the first information, after transmitting the HARQ-ACK information.

According to another aspect of the present disclosure, a method of indicating a spatial parameter by a base station in a wireless communication system, the method comprising: transmitting, to a terminal, downlink control information (DCI) including first information related to at least one spatial parameter, second information related to time domain resource allocation, and third information related to whether data channel being scheduled; receiving, from the terminal, hybrid automatic repeat request-acknowledgement (HARQ-ACK) information based on the second information, based on the third information indicating the data channel not being scheduled; and performing an uplink transmission from the terminal or a downlink reception to the terminal based on the at least one spatial parameter based on the first information, after receiving the HARQ-ACK information.

According to the present disclosure, a method and an apparatus for dynamic indication of a spatial parameter by a base station to a terminal, and for dynamic application of the indicated spatial parameter by a terminal in a wireless communication system may be provided.

According to the present disclosure, a method and an apparatus for dynamic indication and application of a spatial parameter without a scheduling of data transmission or reception in a wireless communication system may be provided.

According to the present disclosure, a method and an apparatus for minimizing an overhead and a delay of indication and application of a spatial parameter in a wireless communication system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
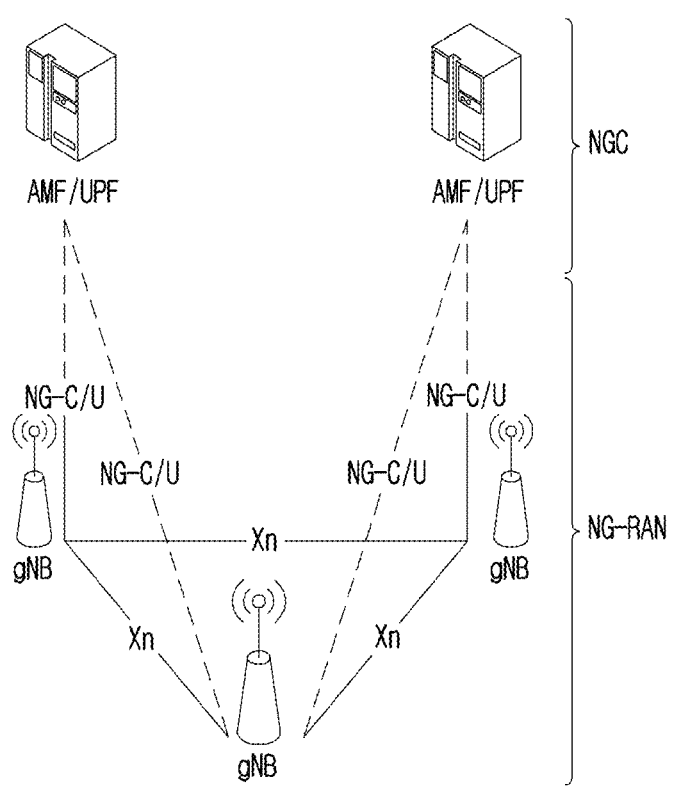
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.
 BM: beam management
 CQI: Channel Quality Indicator
 CRI: channel state information—reference signal resource indicator
 CSI: channel state information
 CSI-IM: channel state information—interference measurement
 CSI-RS: channel state information—reference signal
 DMRS: demodulation reference signal
 FDM: frequency division multiplexing
 FFT: fast Fourier transform
 IFDMA: interleaved frequency division multiple access
 IFFT: inverse fast Fourier transform
 L1-RSRP: Layer 1 reference signal received power
 L1-RSRQ: Layer 1 reference signal received quality
 MAC: medium access control
 NZP: non-zero power
 OFDM: orthogonal frequency division multiplexing
 PDCCH: physical downlink control channel
 PDSCH: physical downlink shared channel
 PMI: precoding matrix indicator
 RE: resource element
 RI: Rank indicator
 RRC: radio resource control
 RSSI: received signal strength indicator
 Rx: Reception
 QCL: quasi co-location
 SINR: signal to interference and noise ratio
 SSB (or SS/PBCH block): Synchronization signal block (including PSS (primary synchronization signal), SSS (secondary synchronization signal) and PBCH (physical broadcast channel))
 TDM: time division multiplexing
 TRP: transmission and reception point
 TRS: tracking reference signal
 Tx: transmission
 UE: user equipment
 ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
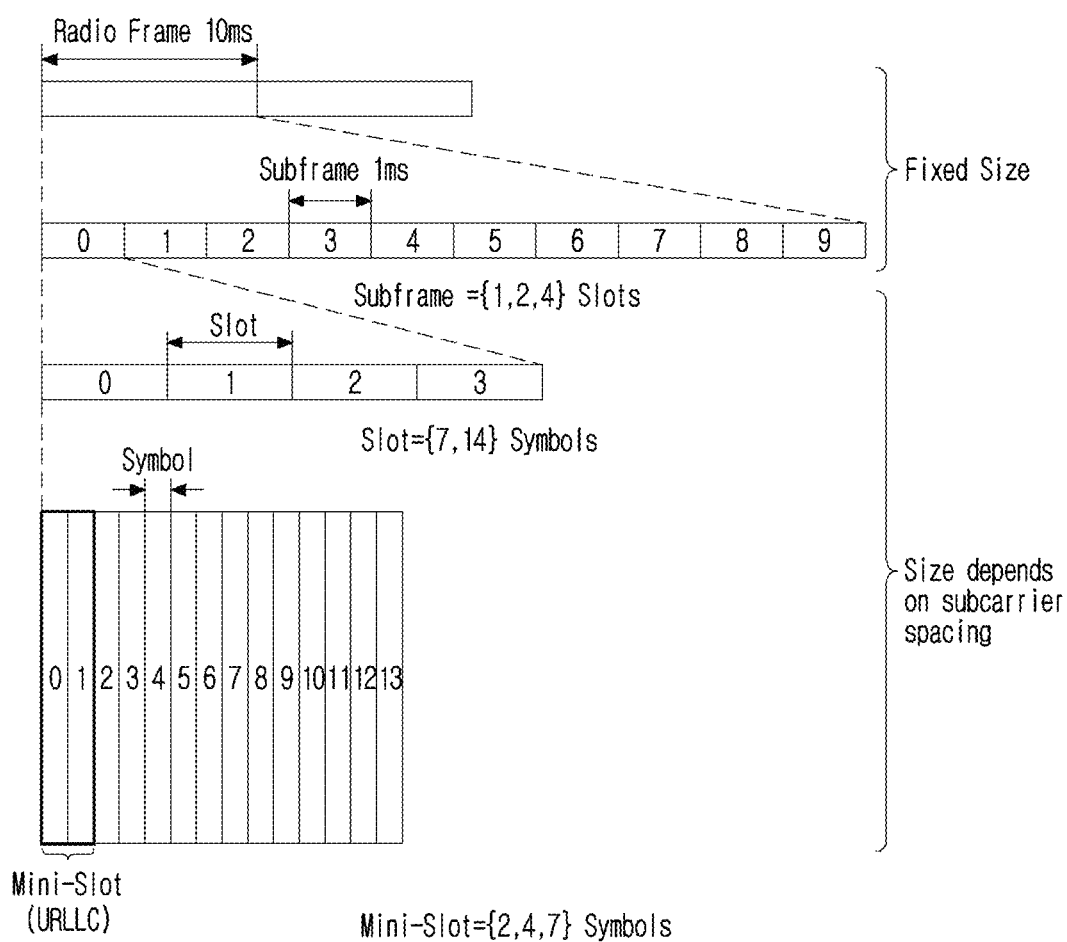
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^μ · 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(Δf_{max} · N_f)$. Here, $Δf_{max}$ is $480·10^3$ Hz and $N_f$ is 4096. Downlink and uplink transmission is configured (organized) with a radio frame having a duration of $T_f = 1/(Δf_{max} N_f/100) · T_c = 10$ ms. Here, a radio frame is configured with 10 subframes having a duration of $T_{sf} = (Δf_{max} N_f/1000) · T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset}) T_c$ than a corresponding downlink frame in a corresponding terminal starts. For a subcarrier spacing configuration slots are numbered in an increasing order of $n_s^μ ∈ \{0, \ldots, N_{slot}^{subframe,μ} - 1\}$ in a subframe and are numbered in an increasing order of $n_{s,f}^μ ∈ \{0, \ldots, N_{slot}^{frame,μ} - 1\}$ in a radio frame. One slot is configured with $N_{symb}^{slot}$ consecutive OFDM symbols and $N_{symb}^{slot}$ is determined according to CP. A start of a slot $n_s^μ$ in a subframe is temporally arranged with a start of an OFDM symbol $n_s^μ N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,μ}$) and the number of slots per subframe ($N_{slot}^{subframe,μ}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1, 2, 4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
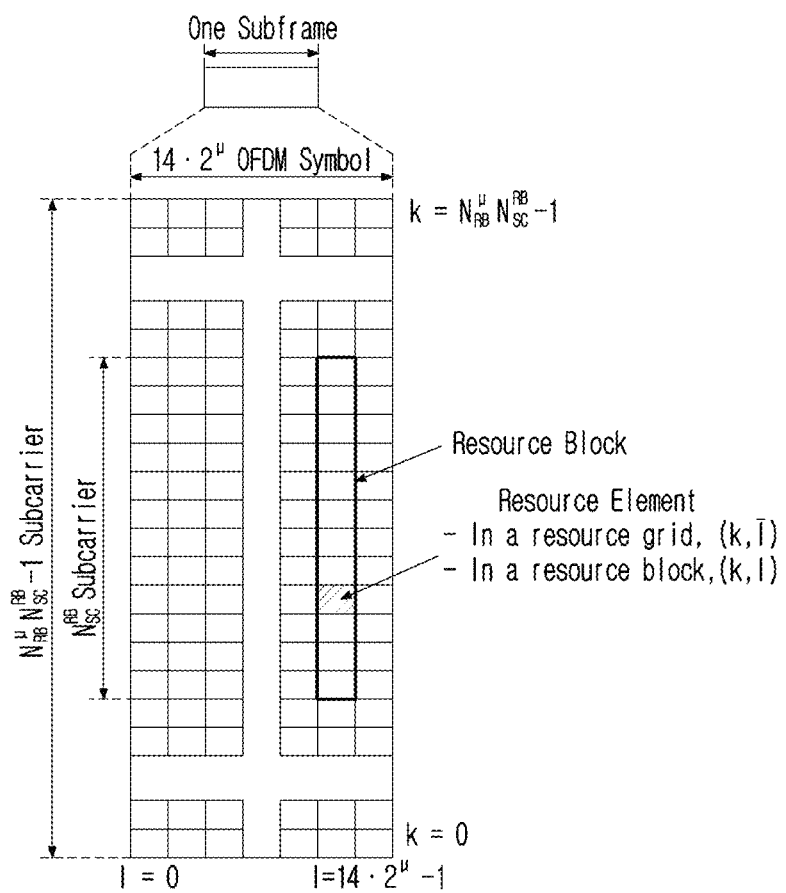
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^μ N_{sc}^{RB}$ subcarriers in a frequency domain and one subframe is configured with $14·2^μ$ OFDM symbols, but it is not limited thereto. In an NR system, a transmitted signal is described by OFDM symbols of $2^μ N_{symb}^{(μ)}$ and one or more resource grids configured with $N_{RB}^μ N_{sc}^{RB}$ subcarriers. Here, $N_{RB}^μ ≤ N_{RB}^{max,μ}$. The $N_{RB}^{max,μ}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RD}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and p. may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^\mu = n_{PRB}^\mu + N_{BWP,i}^{start,\mu} \quad \text{[Equation 2]}$$

$N_{BWP,i}^{start,\mu}$ is a common resource block that a BWP starts relatively to common resource block 0.

Figure 4:
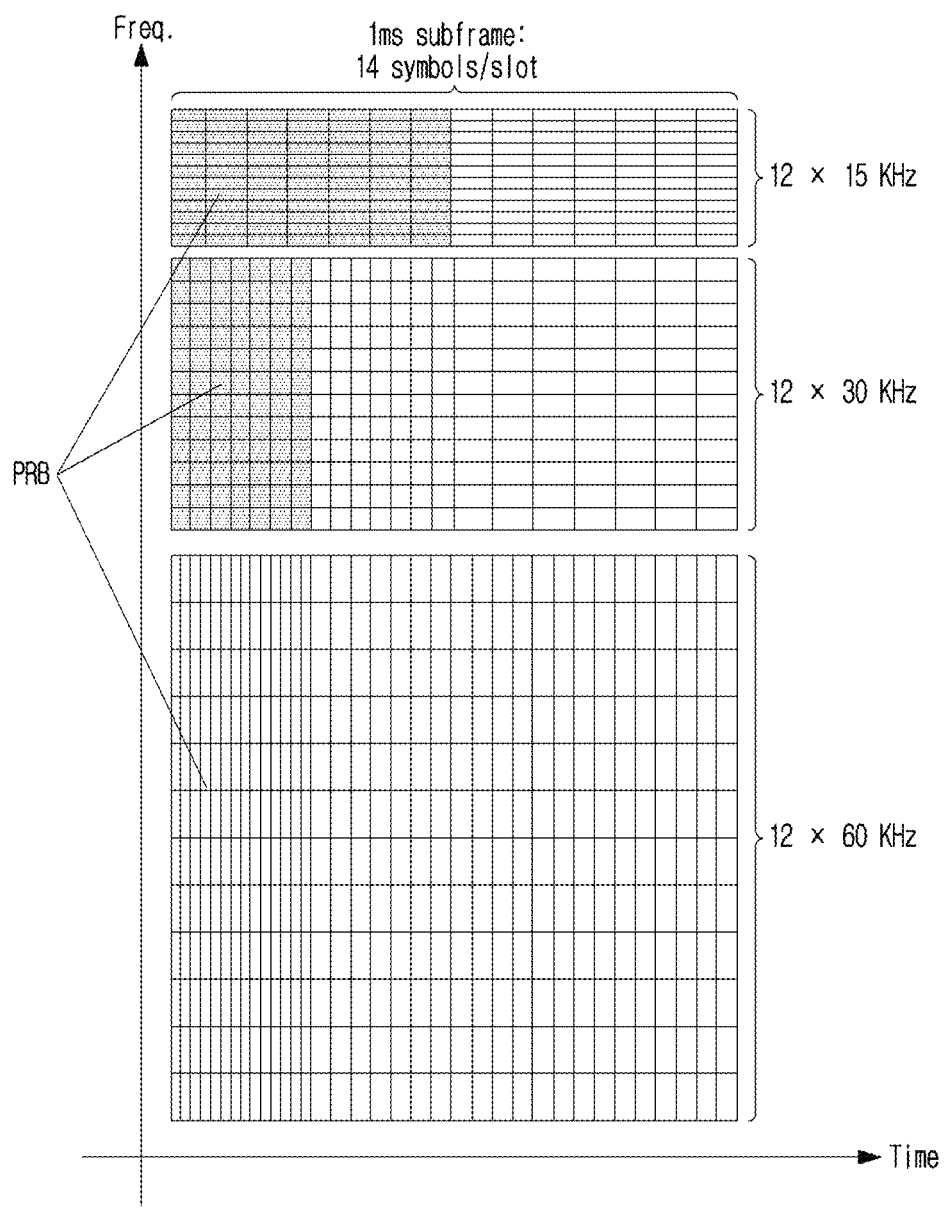
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
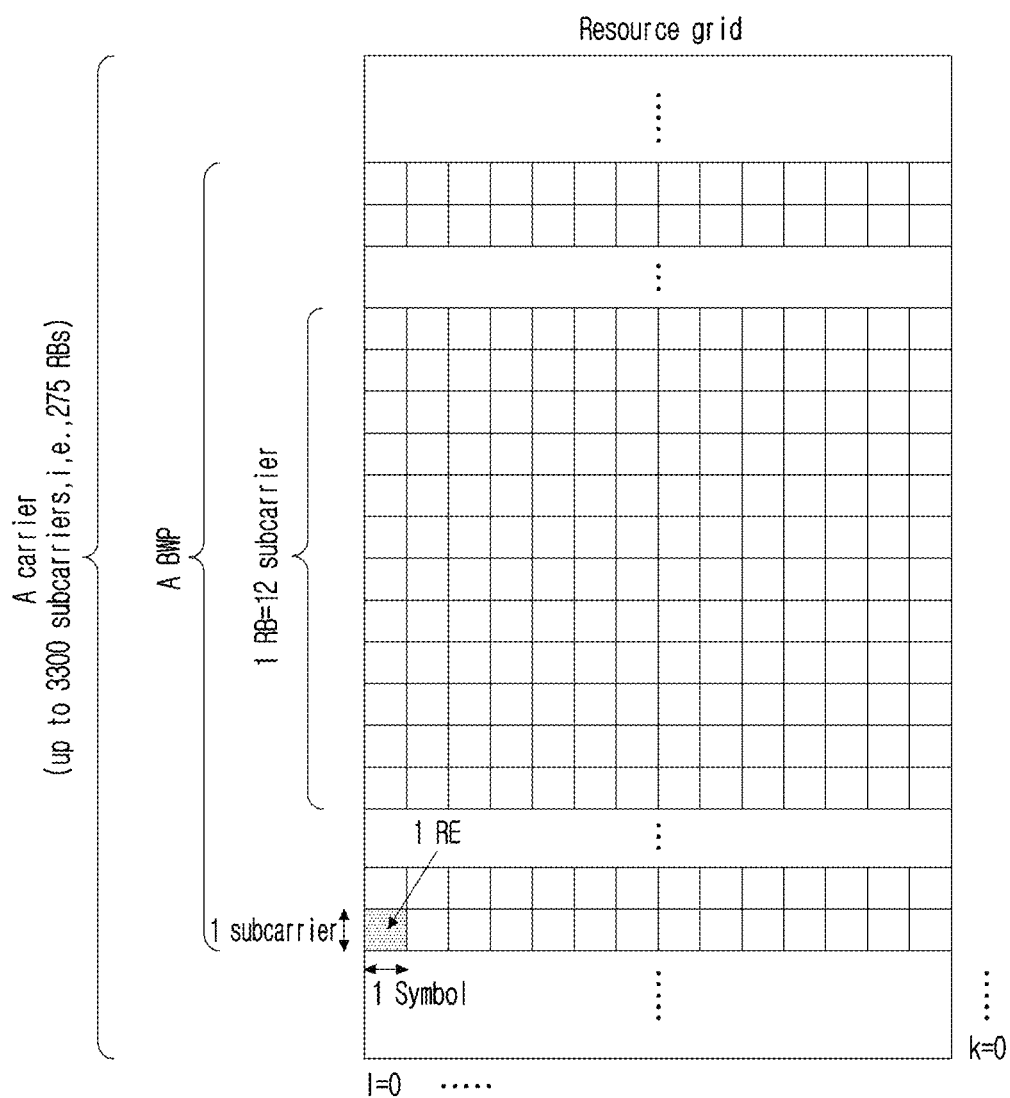
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
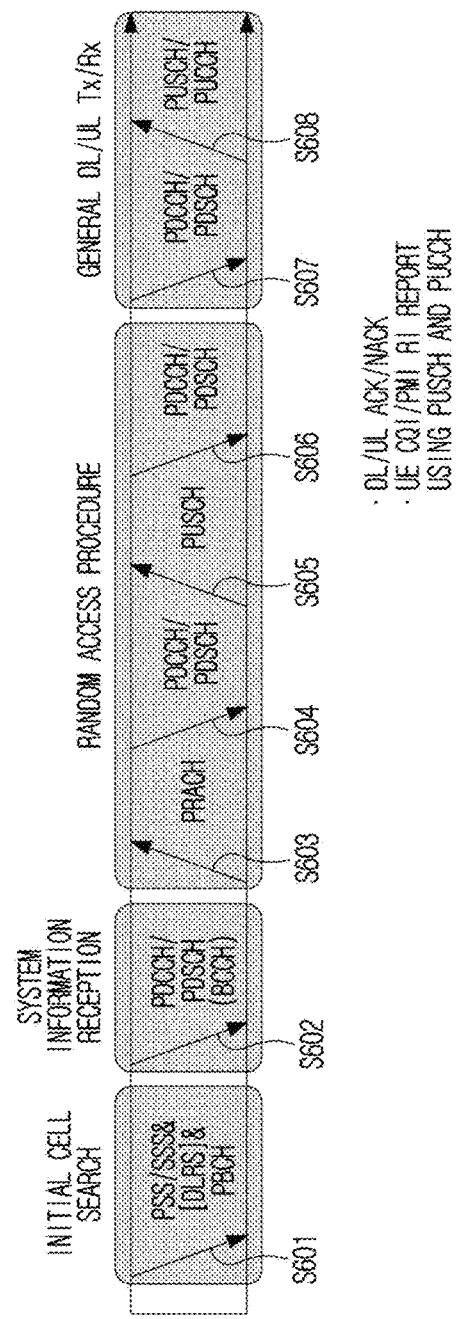
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation and Coding Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Beam Management (BM)

A BM procedure is L1 (layer 1)/L2 (layer 2) procedures to obtain and maintain a set of beams of a base station (e.g., a gNB, a TRP, etc.) and/or terminal (e.g., a UE) beams which may be used for downlink (DL) and uplink (UL) transmission/reception, it may include the following procedures and terms.

Beam measurement: An operation that a base station or a UE measures a property of a received beamformed signal Beam determination: An operation that a base station or a UE selects its Tx beam/Rx beam Beam sweeping: An operation that a spatial region is covered by using a Tx and/or Rx beam for a certain time interval in a pre-determined method Beam report: An operation that a UE reports information of a beamformed signal based on beam measurement A BM procedure may be classified into (1) a DL BM procedure using a SS (synchronization signal)/PBCH (physical broadcast channel) Block or a CSI-RS and (2) an UL BM procedure using an SRS (sounding reference signal).

In addition, each BM procedure may include Tx beam sweeping for determining a Tx Beam and Rx beam sweeping for determining a Rx beam.

Hereinafter, a DL BM procedure will be described.

A DL BM procedure may include (1) transmission of beamformed DL RSs (reference signals) of a base station (e.g., a CSI-RS or a SS Block (SSB)) and (2) beam reporting of a terminal.

Here, beam reporting may include preferred DL RS ID (identifier)(s) and corresponding L1-RSRP (Reference Signal Received Power).

The DL RS ID may be a SSBRI (SSB Resource Indicator) or a CRI (CSI-RS Resource Indicator).

Hereinafter, a DL BM procedure using an SSB will be described.

Figure 7:
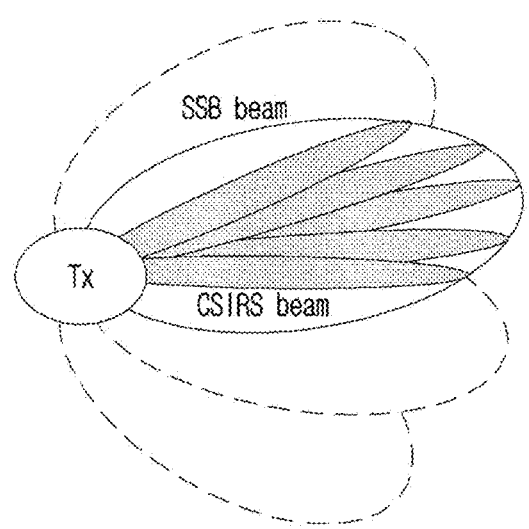
FIG. 7 is a diagram which illustrates a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, an SSB beam and a CSI-RS beam may be used for beam measurement. A measurement metric is L1-RSRP per resource/block. An SSB may be used for coarse beam measurement and a CSI-RS may be used for fine beam measurement. An SSB may be used for both of Tx beam sweeping and Rx beam sweeping.

Rx beam sweeping using an SSB may be performed while an UE changes an Rx beam for the same SSBRI across a plurality of SSB bursts. In this case, one SS burst includes one or more SSBs and one SS burst set includes one or more SSB bursts.

Figure 8:
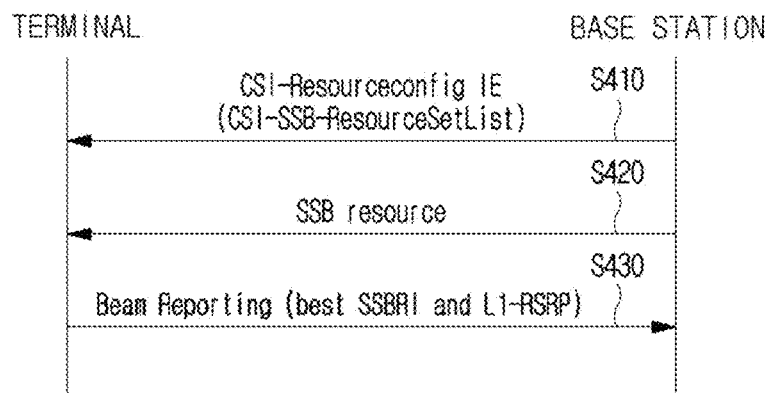
FIG. 8 is a diagram which illustrates a downlink beam management procedure using SSB in a wireless communication system to which the present disclosure may be applied.

FIG. 8 is a diagram which illustrates a downlink beam management procedure using SSB in a wireless communication system to which the present disclosure may be applied.

A configuration on a beam report using an SSB is performed in a CSI/beam configuration in a RRC connected state (or a RRC connected mode).

In reference to FIG. 8, a terminal receives CSI-ResourceConfig IE including CSI-SSB-ResourceSetList including SSB resources used for BM from a base station (S410).

Table 6 represents an example of CSI-ResourceConfig IE and as in Table 6, a BM configuration using an SSB configures an SSB like a CSI-RS resource without being separately defined.

In Table 6, a csi-SSB-ResourceSetList parameter represents a list of SSB resources used for beam management and reporting in one resource set. Here, an SSB resource set may be configured as {SSBx1, SSBx2, SSBx3, SSBx4, . . . }. An SSB index may be defined from 0 to 63. A terminal receives an SSB resource from the base station based on the CSI-SSB-ResourceSetList (S420).

When CSI-RS reportConfig related to a report on a SSBRI and L1-RSRP is configured, the terminal performs (beam) reporting of the best SSBRI and corresponding L1-RSRP to a base station (S430).

Hereinafter, a DL BM procedure using a CSI-RS will be described.

Describing a usage of a CSI-RS, i) a repetition parameter is configured for a specific CSI-RS resource set and when TRS info is not configured, a CSI-RS is used for beam management. ii) when a repetition parameter is not configured and TRS_info is configured, a CSI-RS is used for a TRS (tracking reference signal). iii) when a repetition parameter is not configured and TRS_info is not configured, a CSI-RS is used for CSI acquisition.

Such a repetition parameter may be configured only for CSI-RS resource sets associated with CSI-ReportConfig having a report of L1RSRP or 'No Report (or None)'.

If a terminal is configured with CSI-ReportConfig in which reportQuantity is configured as 'cri-RSRP' or 'none' and CSI-ResourceConfig for channel measurement (a higher layer parameter resourcesForChannelMeasurement) does not include a higher layer parameter 'trs-Info' and includes NZP-CSI-RS-ResourceSet in which a higher layer parameter 'repetition' is configured, the terminal may be configured only with a same number of port (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted with the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted in a different OFDM symbol. In addition, a terminal does not expect to receive a different periodicity in periodicityAndOffset in all CSI-RS resources in NZP-CSI-RS-Resourceset.

TABLE 6

```
ASN1START
TAG-CSI-RESOURCECONFIG-START
CSI-ResourceConfig ::=         SEQUENCE {
csi-ResourceConfigId           CSI-ResourceConfigId,
csi-RS-ResourceSetList         CHOICE {
nzp-CSI-RS-SSB                 SEQUENCE {
nzp-CSI-RS-ResourceSetList     SEQUENCE (SIZE (1..maxNrofNZP-CSI-RS-
ResourceSetsPerConfig)) OF NZP-CSI-RS-ResourceSetId OPTIONAL,
csi-SSB-ResourceSetList        SEQUENCE (SIZE (1 .. maxNrofCSI-SSB-
ResourceSetsPerConfig)) OF CSI-SSB-ResourceSetId OPTIONAL
},
csi-IM-ResourceSetList         SEQUENCE (SIZE (1..maxNrofCSI-IM-
ResourceSetsPerConfig)) OF CSI-IM-ResourceSetId
},
bwp-Id                         BWP-Id,
resourceType                   ENUMERATED { aperiodic, semiPersistent, periodic },
...
TAG-CSI-RESOURCECONFIGTOADDMOD-STOP
-- ASN1STOP
```

Meanwhile, when repetition is configured as 'OFF', it is related to a Tx beam sweeping procedure of a base station. In this case, when repetition is configured as 'OFF', a terminal does not assume that at least one CSI-RS resource in NZP-CSI-RS-ResourceSet is transmitted in the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and corresponding L1-RSRP to a base station.

In addition, when a CSI-RS resource may be configured in the same OFDM symbol(s) as an SSB (SS/PBCH Block) and 'QCL-TypeD' is applicable, the terminal may assume that a CSI-RS and an SSB are quasi co-located with regard to 'QCL-TypeD'.

Here, the QCL TypeD may mean that antenna ports are quasi-colocated with regard to a spatial Rx parameter. When a terminal receives a plurality of DL antenna ports in a QCL Type D relationship, it is allowed to apply the same Rx beam. In addition, a terminal does not expect that a CSI-RS will be configured in a RE overlapped with a RE of an SSB.

Figure 9:
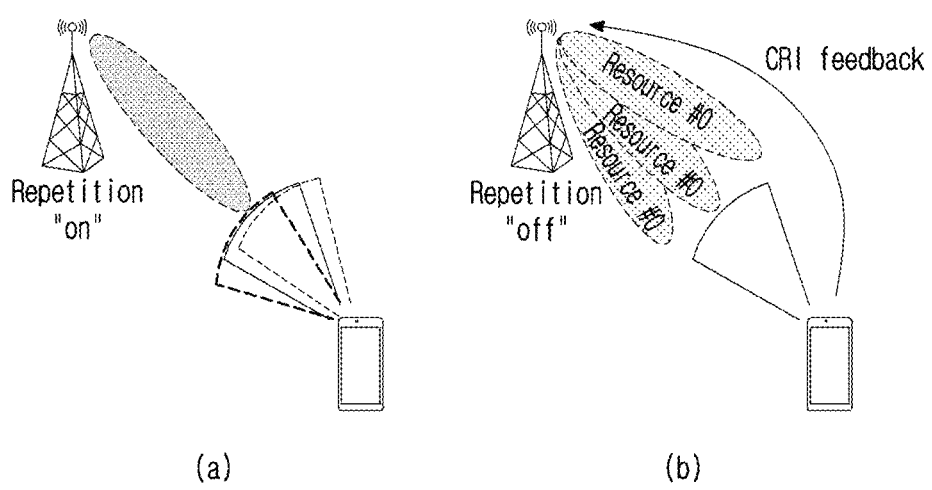
FIG. 9 is a diagram which illustrates a downlink beam management operation using CSI-RS in a wireless communication system to which the present disclosure may be applied.

FIG. 9 is a diagram which illustrates a downlink beam management operation using CSI-RS in a wireless communication system to which the present disclosure may be applied.

FIG. 9(a) represents a Rx beam determination (or refinement) procedure of a terminal and FIG. 9(b) represents a Tx beam sweeping procedure of a base station. In addition, FIG. 9(a) is a case when a repetition parameter is configured as 'ON' and FIG. 9(b) is a case when a repetition parameter is configured as 'OFF'.

Figure 10:
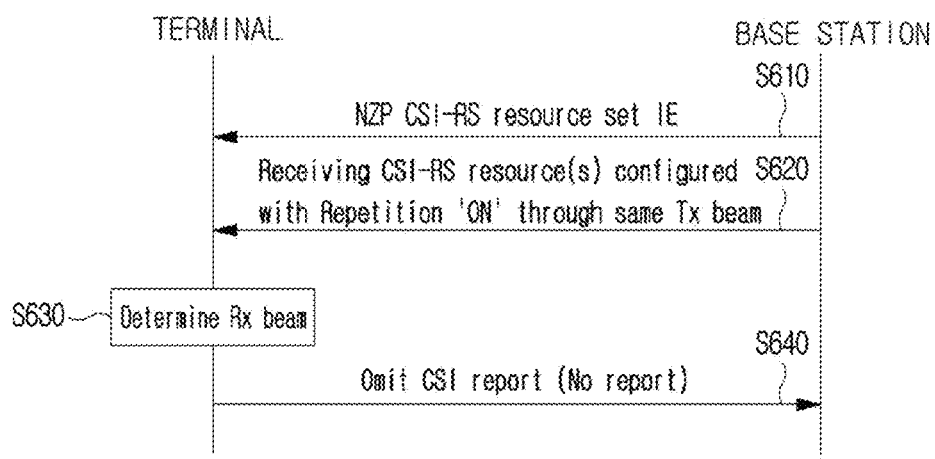
FIG. 10 is a diagram which illustrates an Rx beam determination process of a terminal in a wireless communication system to which the present disclosure may be applied.

FIG. 10 is a diagram which illustrates an Rx beam determination process of a terminal in a wireless communication system to which the present disclosure may be applied.

In reference to FIG. 9(a) and FIG. 10, an Rx beam determination process of a terminal is described.

A terminal receives NZP CSI-RS resource set IE including a higher layer parameter repetition through RRC signaling from a base station (S610). Here, the repetition parameter is configured as 'ON'.

A terminal repetitively receives resources in a CSI-RS resource set configured as repetition 'ON' through the same Tx beam (or DL spatial domain transmission filter) of a base station in a different OFDM symbol (S620).

A terminal determines its Rx beam (S630).

A terminal omits a CSI report (S640). In this case, reportQuantity of a CSI report configuration may be configured as 'No report (or None)'.

In other words, the terminal may omit a CSI report when it is configured as repetition 'ON'.

Figure 11:
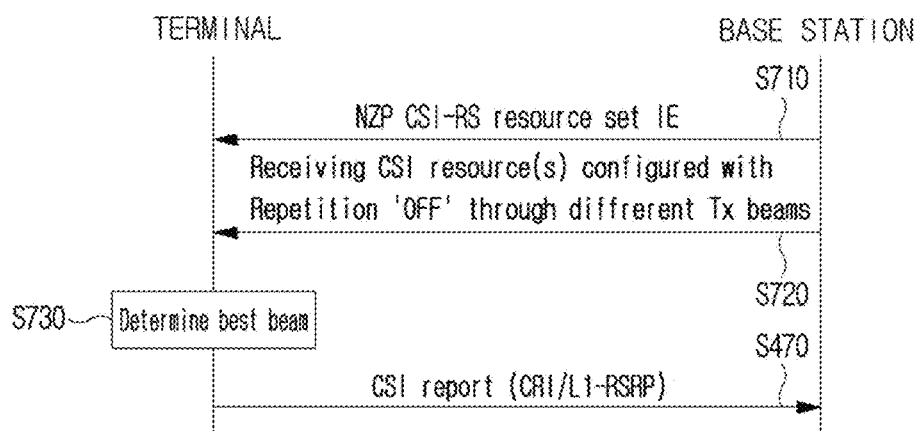
FIG. 11 is a diagram which illustrates a Tx beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9(b) and FIG. 11, a Tx beam determination process of a base station is described.

A terminal receives NZP CSI-RS resource set IE including a higher layer parameter repetition through RRC signaling from a base station (S710). Here, the repetition parameter is configured as 'OFF' and it is related to a Tx beam sweeping procedure of a base station.

A terminal receives resources in a CSI-RS resource set configured as repetition 'OFF' through a different Tx beam (or DL spatial domain transmission filter) of a base station (S720).

A terminal selects (or determines) the best beam (S740).

A terminal reports an ID and related quality information (e.g., L1-RSRP) of a selected beam to a base station (S740). In this case, reportQuantity of a CSI report configuration may be configured as 'CRI+L1-RSRP'.

In other words, when a CSI-RS is transmitted for BM, the terminal reports a CRI and a related L1-RSRP.

Figure 12:
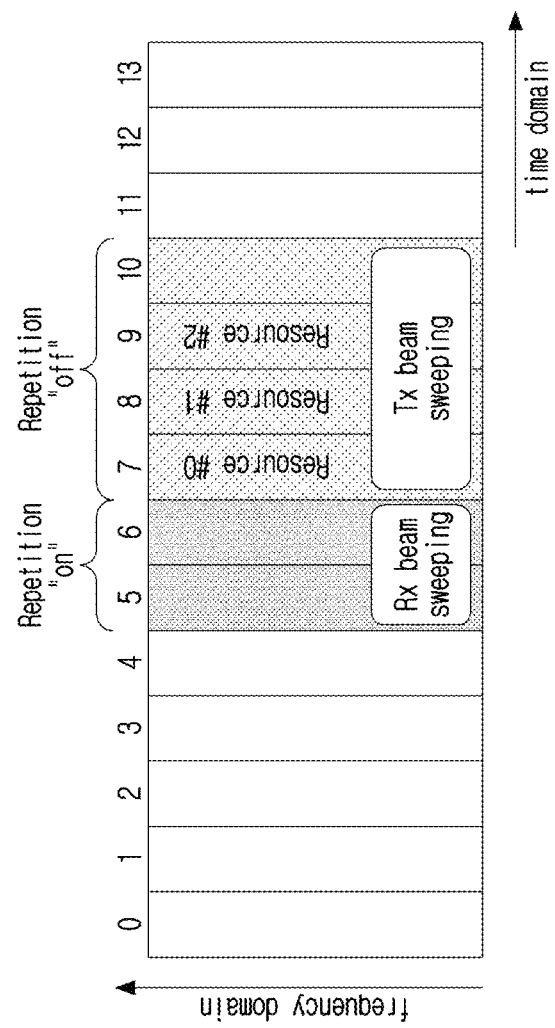
FIG. 12 is a diagram which illustrates resource allocation in a time and frequency domain related to a downlink beam management operation in a wireless communication system to which the present disclosure may be applied.

FIG. 12 is a diagram which illustrates resource allocation in a time and frequency domain related to a downlink beam management operation in a wireless communication system to which the present disclosure may be applied.

In reference to FIG. 12, it is shown that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted in a different Tx beam.

Hereinafter, a beam indication method related to downlink BM will be described.

A terminal may be configured by RRC with a list of a maximum M candidate transmission configuration indication (TCI) states at least for a purpose of a QCL (Quasi Co-location) indication. Here, M may be 64.

Each TCI state may be configured as one RS set. Each ID of a DL RS at least for a spatial QCL purpose (QCL Type D) in a RS set may refer to one of DL RS types such as an SSB, a P (periodic)-CSI RS, an SP (semi-persistent)-CSI RS, an A (aperiodic)-CSI RS, etc.

An ID of DL RS(s) in a RS set used at least for a purpose of a spatial QCL may be initialized/updated at least by explicit signaling.

Table 7 illustrates a TCI-State information element (IE).

A TCI-State IE is associated with a quasi co-location (QCL) type corresponding to one or two DL reference signals (RS).

TABLE 7

| | | |
|---|---|---|
| ASN1START | | |
| TAG-TCI-STATE-START | | |
| TCI-State ::= | SEQUENCE { | |
| tci-StateId | TCI-StateId, | |
| qcl-Type1 | QCL-Info, | |
| qcl-Type2 | QCL-Info | |
| | OPTIONAL, | -- Need R |
| ... | | |
| } | | |
| QCL-Info ::= | SEQUENCE { | |
| cell | ServCellIndex | |
| | OPTIONAL, | -- Need R |
| bwp-Id | BWP-Id | |
| | OPTIONAL, | -- Cond CSI-RS-Indicated |

TABLE 7-continued

```
referenceSignal          CHOICE {
  csi-rs                   NZP-CSI-RS-ResourceId,
  ssb                      SSB-Index
},
qcl-Type                 ENUMERATED {typeA, typeB, typeC, typeD},
...
}
TAG-TCI-STATE-STOP
-- ASN1STOP
```

In Table 7, a bwp-Id parameter represents a DL BWP (bandwidth part) where an RS is located, a cell parameter represents a carrier where a RS is located and a referencesignal parameter represents reference antenna port(s) which is a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated in NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s).

Hereinafter, uplink beam management will be described.

For UL BM, beam reciprocity (or beam correspondence) between a Tx beam and a Rx beam may be valid or may not be valid according to terminal implementation. If reciprocity between a Tx beam and a Rx beam is valid both in a base station and a terminal, a UL beam pair may be matched by a DL beam pair. But, when reciprocity between a Tx beam and a Rx beam is not valid in any one of a base station and a terminal, a process for determining a UL beam pair is required separately from a DL beam pair determination.

In addition, although both of a base station and a terminal maintain beam correspondence, a base station may use a UL BM procedure for determining a DL Tx beam without requesting a terminal to report a preferred beam.

UL BM may be performed through beamformed UL SRS transmission and whether UL BM of an SRS resource set is applied may be configured by a (higher layer parameter) usage. When a usage is configured as 'BeamManagement (BM)', only one SRS resource may be transmitted in each of a plurality of SRS resource sets in a given time instant.

A terminal may be configured with one or more SRS (Sounding Reference Symbol) resource sets configured by (a higher layer parameter) SRS-ResourceSet (through higher layer signaling, RRC signaling, etc.) For each SRS resource set, a UE may be configured with K≥1 SRS resources (a higher layer parameter SRS-resource). Here, K is a natural number and the maximum number of K is indicated by SRS_capability.

Like DL BM, an UL BM procedure may be also classified into Tx beam sweeping of a terminal and Rx beam sweeping of a base station.

Figure 13:
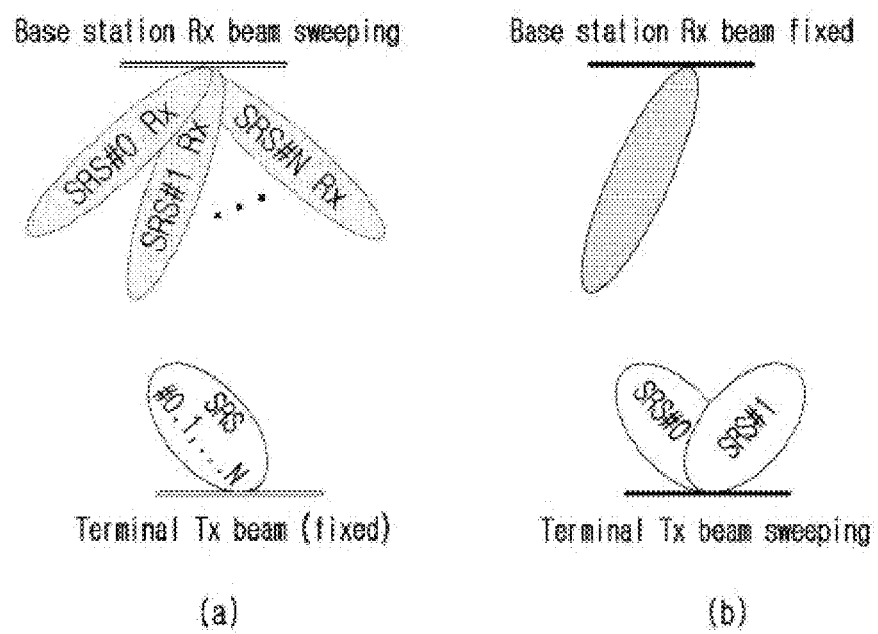
FIG. 13 is a diagram which illustrates an uplink beam management operation using SRS in a wireless communication system to which the present disclosure may be applied.

FIG. 13 is a diagram which illustrates an uplink beam management operation using SRS in a wireless communication system to which the present disclosure may be applied.

FIG. 13(a) illustrates a Rx beam determination operation of a base station and FIG. 13(b) illustrates a Tx beam sweeping operation of a terminal.

Figure 14:
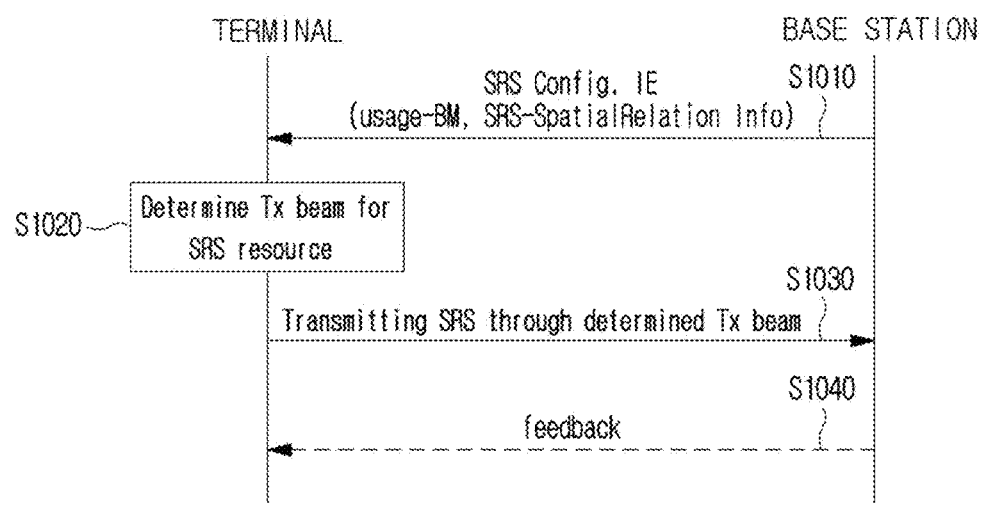
FIG. 14 is a diagram which illustrates an uplink beam management procedure in a wireless communication system to which the present disclosure may be applied.

FIG. 14 is a diagram which illustrates an uplink beam management procedure in a wireless communication system to which the present disclosure may be applied.

A terminal receives RRC signaling (e.g., an SRS-Config IE) including a (higher layer parameter) usage parameter configured as 'beam management' from a base station (S1010).

Table 8 represents an example of an SRS-Config IE (Information Element) and an SRS-Config IE is used for SRS transmission configuration. An SRS-Config IE includes a list of SRS-Resources and a list of SRS-ResourceSets. Each SRS resource set means a set of SRS-resources.

A network may trigger transmission of an SRS resource set by using configured aperiodicSRS-ResourceTrigger (L1 DCI).

TABLE 8

```
ASN1START
TAG-MAC-CELL-GROUP-CONFIG-START
SRS-Config ::=                            SEQUENCE {
  srs-ResourceSetToReleaseList              SEQUENCE       (SIZE(1.. maxNrofSRS-
    ResourceSets)) OF SRS-ResourceSetId       OPTIONAL, -- Need N
  srs-ResourceSetToAddModList               SEQUENCE       (SIZE(1..maxNrofSRS-
    ResourceSets)) OF SRS-ResourceSet         OPTIONAL, -- Need N
  srs-ResourceToReleaseList                 SEQUENCE       (SIZE(1..maxNrofSRS-
    Resources)) OF SRS-ResourceId             OPTIONAL, -- Need N
  srs-ResourceToAddModList                  SEQUENCE       (SIZE(1..maxNrofSRS-
    Resources)) OF SRS-Resource               OPTIONAL, -- Need N
  tpc-Accumulation                          ENUMERATED {disabled}
                                              OPTIONAL, -- Need S
  ...
}
SRS-ResourceSet ::=                       SEQUENCE {
  srs-ResourceSetId                         SRS-ResourceSetId,
  srs-ResourceIdList                        SEQUENCE       (SIZE(1..maxNrofSRS-
    ResourcesPerSet)) OF SRS-ResourceId       OPTIONAL, -- Cond Setup
  resourceType                              CHOICE {
    aperiodic                                 SEQUENCE {
```

TABLE 8-continued

```
aperiodicSRS-ResourceTrigger        INTEGER (1..maxNrofSRS-TriggerStates-1),
csi-RS                              NZP-CSI-RS-ResourceId
                    OPTIONAL, -- Cond NonCodebook
slotOffset                          INTEGER (1..32)
                    OPTIONAL, -- Need S
...
},
semi-persistent                     SEQUENCE {
associatedCSI-RS                    NZP-CSI-RS-ResourceId
                    OPTIONAL, -- Cond NonCodebook
...
},
periodic                            SEQUENCE {
associatedCSI-RS                    NZP-CSI-RS-ResourceId
                    OPTIONAL, -- Cond NonCodebook
...
}
},
usage                               ENUMERATED        {beamManagement,
codebook. nonCodebook, antennaSwitching},
alpha                               Alpha
                    OPTIONAL, -- Need S
p0                                  INTEGER (-202..24)
                    OPTIONAL, -- Cond Setup
pathlossReferenceRS                 CHOICE {
ssb-Index                              SSB-Index,
csi-RS-Index                           NZP-CSI-RS-ResourceId
SRS-SpatialRelationInfo ::=         SEQUENCE {
servingCellId                       ServCellIndex
OPTIONAL, -- Need S
referenceSignal                     CHOICE {
ssb-Index                              SSB-Index,
csi-RS-Index                           NZP-CSI-RS-ResourceId,
srs                                    SEQUENCE {
resourceId                                SRS-ResourceId,
uplinkBWP                                 BWP-Id
}
}
}
SRS-ResourceId ::=                                    INTEGER
(0..maxNrofSRS-Resources-1)
```

In Table 8, usage represents a higher layer parameter which indicates whether an SRS resource set is used for beam management or is used for codebook-based or non-codebook-based transmission. A usage parameter corresponds to a L1parameter 'SRS-SetUse'. 'spatialRelationInfo' is a parameter which represents a configuration of a spatial relation between a reference RS and a target SRS. Here, a reference RS may be a SSB, a CSI-RS or a SRS corresponding to a L1 parameter 'SRS-SpatialRelationInfo'. The usage is configured per SRS resource set. A terminal determines a Tx beam for an SRS resource which will be transmitted based on SRS-SpatialRelationInfo included in the SRS-Config IE (S1020). Here, SRS-SpatialRelationInfo is configured per SRS resource and represents whether the same beam as a beam used in a SSB, a CSI-RS or a SRS will be applied per SRS resource. In addition, SRS-SpatialRelationInfo may be configured or may not be configured for each SRS resource.

If SRS-SpatialRelationInfo is configured for an SRS resource, the same beam as a beam used in a SSB, a CSI-RS or a SRS is applied and transmitted. But, if SRS-SpatialRelationInfo is not configured for an SRS resource, the terminal randomly determines a Tx beam and transmits an SRS through the determined Tx beam (S1030).

In more detail, for a P-SRS that 'SRS-ResourceConfigType' is configured as 'periodic':

i) when SRS-SpatialRelationInfo is configured as 'SSB/PBCH', a UE transmits a corresponding SRS resource by applying the same spatial domain transmission filter (or generated by a corresponding filter) as a spatial domain Rx filter used for SSB/PBCH reception; or ii) when SRS-SpatialRelationInfo is configured as 'CSI-RS', a UE transmits a SRS resource by applying the same spatial domain transmission filter used for periodic CSI-RS or SP (semi-persistent) CSI-RS reception; or iii) when SRS-SpatialRelationInfo is configured as 'SRS', a UE transmits a corresponding SRS resource by applying the same spatial domain transmission filter used for periodic SRS transmission.

Although 'SRS-ResourceConfigType' is configured as 'SP (semi-persistent)-SRS' or 'AP (aperiodic)-SRS', a beam determination and transmission operation may be applied in a way similar to the above.

Additionally, a terminal may receive or may not receive a feedback on an SRS from a base station as in the following three cases (S1040).

i) when Spatial_Relation_Info is configured for all SRS resources in a SRS resource set, a terminal transmits an SRS with a beam indicated by a base station. For example, when Spatial_Relation_Info indicates all the same SSB, CRI or SRI, a terminal repetitively transmits an SRS with the same beam. This case corresponds to FIG. 13(a) as a usage for a base station to select an Rx beam.

ii) Spatial_Relation_Info may not be configured for all SRS resources in an SRS resource set. In this case, a terminal may transmit with freely changing SRS beams. In other words, this case corresponds to FIG. 13(b) as a usage for a terminal to sweep Tx beams.

iii) Spatial_Relation_Info may be configured only for a part of SRS resources in an SRS resource set. In this case, for a configured SRS resource, an SRS may be transmitted with an indicated beam, and for a SRS resource that Spatial_Relation_Info is not configured an SRS may be transmitted by randomly applying a Tx beam by a terminal.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number (S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement
NZP CSI-RS resource for interference measurement
NZP CSI-RS resource for channel measurement In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resourece setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.
Each NZP CSI-RS port configured for interference measurement corresponds to an interference transmission layer.
All interference transmission layers of an NZP CSI-RS port for interference measurement consider EPRE (energy per resource element) ratio.
A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC. DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset(Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot $n+3N_{slot}^{subframe,\mu}+1$. After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL, UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1, UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL), UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE, UE may expect that a tci-PresentInDCI parameter is set to be enabled for a corresponding CORESET. When one or more TCI states are configured for a serving cell scheduled by a search space set including QCL-TypeD, UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDurationForQCL), UE may assume that a DMRS port of a PDSCH of a serving cell is quasi-colocated with RS(s) for QCL parameter(s) used for PDCCH QCL indication of a CORESET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).

QCL-TypeC with a SS/PBCH block, and if applicable, QCL-TypeD with the same SS/PBCH block, or QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-ResourceSet including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a SS/PBCH block, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or when QCL-TypeD is not applicable, QCL-TypeB with a CSI-RS resource in configured NZP-CSI-RS-ResourceSet including a higher layer parameter trs-Info.

For a CSI-RS resource of configured NZP-CSI-RS-ResourceSet including a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeC with a SS/PBCH block, and if applicable, QCL-TypeD with the same SS/PBCH block.

For a DMRS of a PDCCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Dynamic Indication of Spatial Parameter

Hereinafter, various examples of the present disclosure for dynamically indicating and applying a spatial parameter will be described.

A spatial parameter (or a parameter related to beam transmission/reception) related to downlink transmission/reception may include QCL information applied to a physical channel through which downlink control information or data is transmitted and received or assumed by the terminal. The QCL information may include QCL reference signal (RS) information, and the QCL RS information may be configured for each QCL type (e.g., QCL type A/B/C/D). For example, downlink control information (DCI) may be transmitted and received through PDCCH, and a spatial parameter related to DCI transmission/reception may include QCL reference information for PDCCH DMRS antenna port(s), TCI state information, etc. In addition, downlink data may be transmitted and received through PDSCH, and a spatial parameter related to downlink data transmission/reception may include QCL reference information for PDSCH DMRS antenna port(s), TCI state information, etc.

However, in the present disclosure, the term spatial parameter is not limited to QCL information and may include a spatial parameter applied to uplink transmission (e.g., spatial relation info related to an uplink transmission beam). For example, uplink control information (UCI) may be transmitted/received through PUCCH and/or PUSCH, and a spatial parameter related to UCI transmission/reception may include PRI (PUCCH resource indicator), SRI, spatial relation info, UL TCI state related to PUCCH/PUSCH transmission/reception, or QCL reference RS related to thereof, etc.

In addition, a spatial parameter may be separately set for downlink or uplink, or may be configured integrally for downlink and uplink.

In addition, a spatial parameter may also be defined or configured as a spatial parameter set including at least one spatial parameter. Hereinafter, in order to simplify the description, at least one spatial parameter is collectively referred to as a spatial parameter.

In the following description, spatial parameter or spatial relation info may mean including RS information/QCL related (or reference) RS information/QCL parameters, TCI state or the like for spatial related assumption for data/signal transmitted/received through UL channel/DL channel (hereinafter, DL/UL channel/signal), or may be expressed by being mixed/replaced by the above terms.

In the following examples, the meaning of using/applying/mapping a specific spatial parameter (or TCI state or TCI) when transmitting/receiving data/DCI/UCI for a certain frequency/time/spatial resource is that in the case of DL estimating a channel from DMRS using the QCL type and QCL RS indicated by the corresponding spatial parameter in corresponding frequency/time/spatial resources and receiving/demodulating data/DCI (e.g., PDSCH/PDCCH) with the estimated channel and in the case of UL transmitting/modulating DMRS and data/UCI (e.g., PUSCH/PUCCH) using transmission beam and/or transmission power indicated by the corresponding spatial parameter in corresponding frequency/time/spatial resources.

Figure 15:
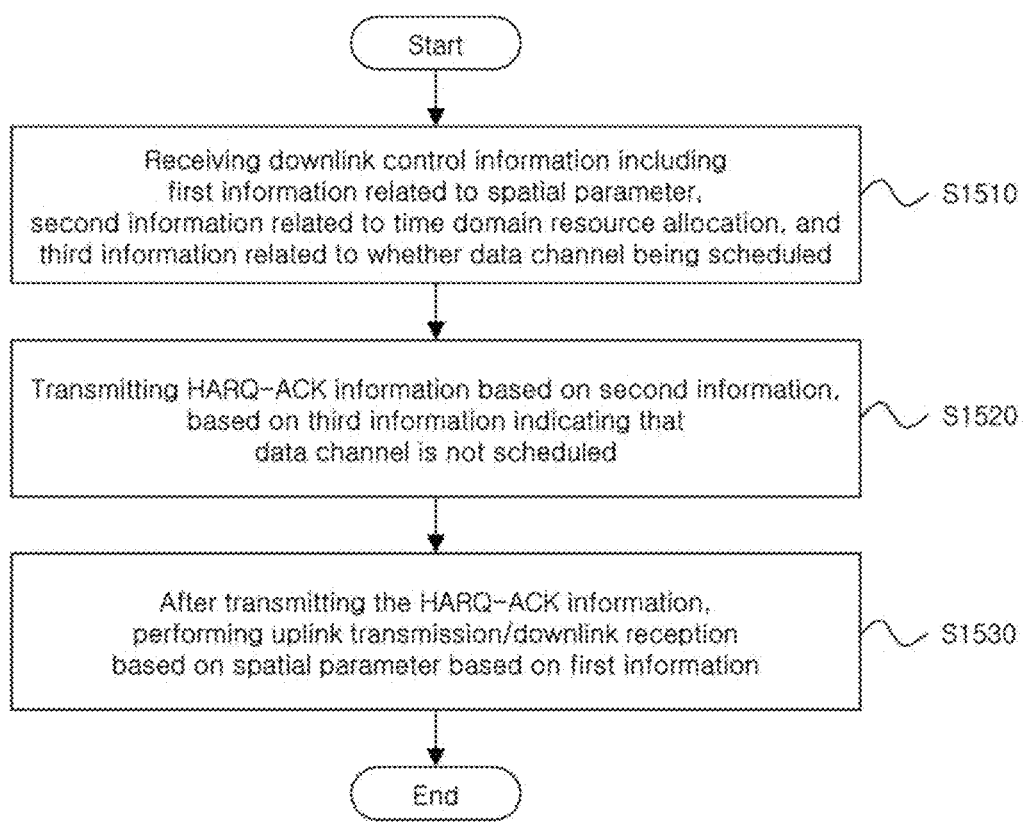
FIG. 15 is a flowchart for illustrating method of a dynamic indication and application of a spatial parameter according to the present disclosure.

FIG. 15 is a flowchart for illustrating method of a dynamic indication and application of a spatial parameter according to the present disclosure.

In step S1510, a terminal may receive downlink control information (DCI) from a base station.

For a DCI format of a dynamic indication of a spatial parameter, DCI formats (hereinafter, DL DCI) for DL assignment (e.g., DCI format 1 series) or DCI formats (hereinafter, UL DCI) for UL grant (e.g., DCI format 0 series) may be used. In addition, DCI of dynamic indication of a spatial parameter may be transmitted through a PDCCH.

DCI of dynamic indication of a spatial parameter may include first information related to at least one spatial parameter, second information related to time domain resource allocation (TDRA), and third information related to whether data channel (e.g., PDSCH or PUSCH) being scheduled.

For example, when the third information indicates that a data channel is scheduled, a spatial parameter based on the first information may be applied to a channel (e.g., PDSCH or PUSCH) carrying scheduled data. Such DCI may correspond to a conventional DL assignment DCI or UL grant DCI which involves scheduling of a data channel and indicates a spatial parameter of the data channel, but may not correspond to a spatial parameter indication DCI in the present disclosure.

For example, when the third information indicates that the data channel is not scheduled, the terminal may apply or update a spatial parameter based on the first information, and may apply the updated spatial parameter to UL/DL channel/signal transmission/reception performed subsequently after corresponding DCI. Here, the UL/DL channel/signal following the DCI is distinguished from a data channel scheduled by the DCI.

In addition, the spatial parameter based on the first information may include at least one of a spatial parameter directly indicated by the first information, or a spatial parameter having a linkage to a spatial parameter directly indicated by the first information.

That is, according to the spatial parameter indication DCI in the present disclosure, the changed spatial parameter may be applied (or the spatial parameter updated) for the terminal without scheduling of the data channel. Accordingly, since it is not necessary to perform scheduling and transmission/reception of the data channel for changing/updating spatial parameters for the terminal, overhead and delay required for transmission/reception of the data channel may be reduced.

Here, the third information may be indicated by one or more fields in the DCI. For example, the third information may be indicated by a combination of two or more fields in DCI.

For example, when at least one field of frequency domain resource assignment (FDRA), RV, MCS, NDI, or HARQ process number (HPN) in DCI has a specific value, it may indicate that the data channel is not scheduled. For example, when the FDRA field has a specific value, it may indicate that the data channel is not scheduled. For example, in addition to the FDRA field having a specific value, when at least one of the RV, MCS, NDI, or HPN field has a specific value, it may indicate that the data channel is not scheduled. For example, when FDRA, RV, MCS, and NDI (or FDRA, RV, MCS, NDI, and HPN) have respective (i.e., the same or different) specific values, by a combination thereof, it may indicate that the data channel is not scheduled. In addition to the FDRA, RV, MCS, NDI, and HPN fields, other fields in DCI or a combination of a plurality of fields may indicate whether a data channel is scheduled or not.

In step S1520, the terminal may transmit HARQ-ACK information to the base station.

When the third information indicates that the data channel is scheduled, the HARQ-ACK information may be information indicating that the data channel (e.g., PDSCH) scheduled by DCI is successfully decoded. In this case, the second information related to the TDRA may indicate a time position of the PDSCH being scheduled. In addition, the position of the ACK information for the PDSCH in the HARQ-ACK codebook related to the format of HARQ-ACK transmission may be determined by a time interval between the PDSCH and HARQ feedback indicated by a separate indication information (e.g., dl-Data-ToUL-ACK or PDSCH-to-HARQ feedback timing indicator).

When the third information indicates that the data channel is not scheduled, the HARQ-ACK information may be information indicating that spatial parameter indication DCI (or PDCCH carrying the spatial parameter indication DCI) is successfully decoded. Here, the position of the ACK information for DCI/PDCCH in the HARQ-ACK codebook may be determined based on the second information (i.e., TDRA).

Meanwhile, for the case of SPS (semi-persistent) PDSCH release through DCI, HARQ-ACK for DCI/PDCCH may be transmitted, but the position of ACK information in the HARQ-ACK codebook for the DCI/PDCCH for the purpose of SPS PDSCH release is not determined based on TDRA, and may be determined by a time interval between the PDSCH and HARQ feedback indicated by a separate indication information (e.g., dl-Data-ToUL-ACK or PDSCH-to-HARQ feedback timing indicator), analogously to HARQ ACK transmission for PDSCH.

That is, the second information related to the TDRA indicating the time position of a data channel if the data channel is scheduled, when it is indicated that the data channel is not scheduled by the third information, may be used for a time position of HARQ-ACK transmission for DCI/PDCCH, or for the position of ACK information in the HARQ-ACK codebook (in particular, the Type-1 (or semi-static) HARQ-ACK codebook).

After transmitting the HARQ-ACK information in step S1530, the terminal may perform UL/DL transmission/reception based on at least one spatial parameter based on the first information. After the terminal transmits HARQ-ACK information indicating that the spatial parameter indication DCI has been successfully received, at least one spatial parameter based on the first information may be applied (or changed or updated). UL/DL transmission/reception performed after a time point at which at least one spatial parameter based on the first information is applied (unless there is an additional indication of a spatial parameter) may be performed based on the at least one spatial parameter based on the first information.

As described in step S1510, when the third information in the spatial parameter indication DCI indicates that the data channel is not scheduled, the terminal may apply or update the spatial parameter based on the first information in the DCI, and the updated spatial parameter may be applied to UL/DL channel/signal transmission/reception performed after reception of the DCI (or after transmission of HARQ-ACK information for the corresponding DCI). Here, the UL/DL channel/signal is not limited to a data channel (e.g., terminal-dedicated PDSCH, dynamic-grant-based PUSCH), and various channels transmitted/received by the terminal (e.g., non-terminal-dedicated PDSCH, non-terminal-dedicated PDCCH, configured grant-based PUSCH, PUCCH, etc.) and/or various signals (e.g., CSI-RS, SRS, etc.).

In addition, the interval between the time point when the terminal transmits the HARQ-ACK for the spatial parameter indication DCI and the time point applying the changed or updated spatial parameter may be predefined or configured/indicated by the base station.

Hereinafter, detailed examples of the present disclosure related to spatial parameter indication DCI will be described.

First, an updating scheme of a DL spatial parameter (or DL TCI state) through DCI in a conventional NR beam management operation will be described.

For up to 128 candidate (candidate) TCI states configured by RRC, 8 of them may be activated (or down-selected) by MAC-CE, and may be mapped to codepoints of the TCI field of DL DCI. In this regard, by the TCI field of the DL DCI for scheduling of the subsequent PDSCH, one of the TCI states activated by the MAC CE may be dynamically indicated. For PUSCH beam indication through UL DCI, the base station may indicate the terminal with DCI format 0_1 for PUSCH scheduling, and may indicate through the SRI field in the UL DCI an SRS resource as a reference to configure/indicate the corresponding PUSCH transmission beam.

Next, a UL spatial parameter (or UL TCI) framework will be described.

Basically, in order for the base station to indicate to the terminal a transmission beam to be used when the terminal transmits a UL channel, spatialRelationInfo may be used. The base station may configure/indicate DL RS (e.g., SSB-RI (resource indicator), (periodic/semi-persistent/aperiodic) CRI (CSI-RS resource indicator)), or an SRS resource to the terminal as a reference RS for the target UL channel and/or the target RS through RRC configuration. Through this, the base station may indicate which UL transmission beam to use when the corresponding terminal transmits PUCCH and/or SRS. In addition, when the base station schedules the PUSCH to the terminal, the SRS transmission beam indicated by the base station may be indicated as a transmission beam for PUSCH transmission through the SRI field, and the SRS transmission beam may be used as a PUSCH transmission beam of the terminal.

In addition, two UL MIMO transmission schemes for PUSCH transmission may be considered, one is a codebook based (CB) UL transmission scheme, and the other is a non-codebook based (NCB or non-CB) UL transmission scheme.

In the following description, "transmitting an SRS resource set" may be used in the same meaning as "transmitting an SRS based on information configured in the SRS resource set", and "transmitting an SRS resource" or "transmitting SRS resources" may be used in the same meaning as "transmitting an SRS(s) based on information configured in the SRS resource(s)".

In the case of the CB UL transmission scheme, the base station may first configure and/or indicate the terminal the SRS resource set of the CB purpose (e.g., usage), and the terminal may transmit an SRS based on a specific n-port SRS resource in the corresponding SRS resource set. The base station may acquire UL channel related information based on the corresponding SRS transmission, and may use the UL channel related information for PUSCH scheduling for the terminal.

Thereafter, the base station may perform PUSCH scheduling through UL DCI, and may indicate the SRS resource for the CB that was previously used for SRS transmission of the terminal through the SRI field of the DCI, and accordingly, the base station may indicate the PUSCH transmission beam of the terminal. In addition, the base station may indicate the UL codebook through the Transmit Precoding Matrix Indicator (TPMI) field, and accordingly, the base station may indicate the UL rank and the UL precoder to the terminal. The corresponding terminal may perform PUSCH transmission as indicated by the base station.

In the case of the NCB UL transmission scheme, the base station may first configure and/or indicate the SRS resource set of the non-CB purpose (e.g., usage) to the terminal, and the terminal may determine, based on the reception of the NZP CSI-RS linked to the corresponding resource set, the precoder to be applied in the SRS resources (up to 4 resources, 1 port per resource) in the corresponding SRS resource set. The corresponding terminal may transmit the SRS simultaneously based on the corresponding SRS resources based on the determined precoder. Thereafter, the base station may perform PUSCH scheduling through UL DCI, and may indicate some of the non-CB SRS resources previously used for SRS transmission of the terminal through the SRI field of the DCI, and accordingly, the base station may indicate the PUSCH transmission beam of the terminal. In addition, at the same time, the base station may indicate the UL rank and the UL precoder through the SRI field. The corresponding terminal may perform PUSCH transmission as indicated by the base station.

A method of indicating a panel and/or a beam of a terminal in uplink transmission is as follows.

The base station may configure/indicate a panel-specific transmission for UL transmission. To this end, a UL-TCI framework may be introduced, and UL-TCI-based signaling may be performed similarly to DL beam indication. For example, a new panel ID may be introduced. Panel-specific signaling may be performed using the UL-TCI state. UL-TCI states may be defined as shown in Table 9 below.

reference RS or a source RS configured by the base station when transmitting the target UL channel and/or the target UL RS.

When the UL-TCI framework is applied, compared with the conventional 'SRI-based PUSCH scheduling and PUSCH beam indication' scheme which requires a transmission of an SRS for CB or non-CB purpose before SRI indication for PUSCH transmission, it is advantageous in that overhead and delay may be reduced when configuring and/or indicating a PUSCH transmission beam. In addition, the scheme based on the UL-TCI framework has an advantage that may be universally applied to all UL channels/RSs such as PUCCH/PUSCH/PRACH/SRS.

As shown in Table 9, a unified signaling scheme for the base station to configure/indicate a transmission panel/beam for UL channel/RS and/or a DL channel/RS reception panel/beam of the terminal may be considered. As one scheme for this, when a beam/panel RS (e.g., QCL type D RS, spatial relation RS) is indicated or updated with DCI for PDSCH or PUSCH, not only the beam/panel RS for the corresponding PDSCH or PUSCH but also QCL (type-D) RS for other DL channels/signals (associated with the corresponding channel) and/or spatial relation RS for other UL channels/signals

TABLE 9

| Valid UL-TCI state Configuration | Source (reference) RS | (target) UL RS | [qcl-Type] |
|---|---|---|---|
| 1 | SRS resource (for BM) + [panel ID] | DM-RS for PUCCH or SRS or PRACH | Spatial-relation |
| 2 | DL RS(a CSI-RS resource or a SSB) + [panel ID] | DM-RS for PUCCH or SRS or PRACH | Spatial-relation |
| 3 | DL RS(a CSI-RS resource or a SSB) + [panel ID] | DM-RS for PUSCH | Spatial-relation + [port(s)-indication] |
| 4 | DL RS(a CSI-RS resource or a SSB) and SRS resource + [panel ID] | DM-RS for PUSCH | Spatial-relation + [port(s)-indication] |
| 5 | SRS resource + [panel ID] | DM-RS for PUSCH | Spatial-relation + [port(s)-indication] |
| 6 | UL RS(a SRS for BM) and SRS resource + [panel ID] | DM-RS for PUSCH | Spatial-relation + [port(s)-indication] |

Additionally or alternatively, a new panel ID may be introduced, which may be implicitly/explicitly applied to transmission for a target RS resource or resource set, for a PUCCH resource, an SRS resource, a PRACH, or the like. Panel-specific signaling may be performed implicitly (e.g., by DL beam reporting) or explicitly using a new panel ID. When explicitly signaled, the ID may be configured in a target RS/channel or a reference RS (e.g., in DL RS resource configuration or in spatial relation info). A new MAC CE may not be specified for the purpose of introducing the ID.

As shown in Table 9, a unified framework may be considered, for the base station to configure and/or indicate a transmission panel/beam for the UL channel and/or UL RS of the terminal. Such a framework may be referred to as a UL-TCI framework for convenience of description as an example. The UL-TCI framework may be a form of extending the DL-TCI framework considered in the conventional scheme (e.g., Rel-15 NR system) to UL. When based on the UL-TCI framework, the base station may configure, through a higher layer signaling (e.g. RRC configuration), DL RS (e.g., SSB-RI, CRI) and/or UL RS (e.g., SRS) to the terminal, as a reference RS or a source RS to be used/applied as a transmission beam for a target UL channel (e.g., PUCCH, PUSCH, PRACH) and/or a target UL RS (e.g., SRS). The corresponding terminal may use a transmission beam of a (associated with the corresponding channel) may also be updated simultaneously (or after a specific time) be updated to the indicated beam/panel RS.

Here, in order to update DL/UL TCI through UL/DL DCI, data scheduling for DL/UL is required. That is, even though there is no transmission/reception data from a DL/UL perspective, scheduling of PDSCH/PUSCH needs to be involved for dynamic beam indication/update, which leads to degradation in terms of overhead, delay, and overall system performance. In the present disclosure, dynamic beam indication/update capable of reducing signaling overhead (e.g., PDSCH/PUSCH scheduling) and delay involved when updating a beam through DL DCI or UL DCI (when there is no UL/DL data) is described.

In the following description, dynamic beam indication/update DCI refers to DCI that indicates/updates a DL/UL beam (or DL/UL spatial parameter) without data channel (e.g., PDSCH or PUSCH) scheduling.

Embodiment 1

The present embodiment is related to UL DCI for dynamic beam indication/update. A base station may configure and transmit UL DCI a terminal according to embodiments described below. The terminal may apply the beam indication or perform beam update according to the indication by the corresponding DCI without PUSCH scheduling/transmission.

In the following description, configuring/indicating the UL-SCH includes scheduling the PUSCH, which is a physical channel carrying the UL-SCH. In addition, configuring/indicating aperiodic (AP) CSI triggering includes triggering AP CSI-RS and/or AP CSI reporting.

Embodiment 1-1: UL-SCH and AP CSI triggering may not be configured/indicated in UL DCI.

Embodiment 1-2: UL-SCH may not be configured/indicated, and no report quantity may be configured/indicated for CSI reporting by AP CSI triggering in UL DCI.

Embodiment 1-3: UL TCI codepoint(s) for not performing PUSCH scheduling may be defined/configured, or the corresponding information may be jointly encoded.

According to the above embodiments, the terminal may update the UL/DL beam (for specific UL/DL channel/signals) together to the (specific) RS indicated through the SRI or UL TCI field of the corresponding UL DCI.

The proposed method is for the UL DCI parameter configuration and setting for the purpose of dynamic beam indication/update, not general PUSCH scheduling. Upon receiving the corresponding UL DCI, the terminal may perform beam indication application/beam update according to SRI/UL TCI field information of the corresponding DCI without performing PUSCH transmission.

The terminal receiving the dynamic beam indication DCI may ignore PUSCH resource allocation related information of the UL DCI. Alternatively, the base station may indicate a specific defined/agreed value (e.g., a reserved codepoint) in the PUSCH resource allocation related field in the DCI.

For the configuration/setting of the UL DCI parameter for performing such an operation, first, the UL-SCH for UL data transmission may not be configured/indicated, and the CSI request field for AP CSI reporting may be set to a value indicating 'no trigger' (Embodiment 1-1). Accordingly, since PUSCH scheduling is not performed for both UL data and CSI report, the terminal may understand that the corresponding UL DCI indication is indicated for the purpose of dynamic beam indication/update.

Additionally or alternatively, the UL-SCH may not be configured/indicated, and report quantity may be set to correspond to none for the CSI triggered by the CSI request field (Embodiment 1-2). Accordingly, since PUSCH scheduling is not performed for UL data and PUSCH scheduling is not performed because there is no content to report on AP CSI report, the terminal may understand that the corresponding UL DCI indication is for the purpose of dynamic beam indication/update. Similar to the case of aperiodic TRS (tracking RS) and CSI-RS in which repetition is set to ON, the reporting quantity set to none means that although CSI reporting is triggered, there is no object to report, and it may correspond to a case where AP TRS is triggered or a case where repetition=ON is set.

Additionally or alternatively, in the SRI/UL TCI field, a specific codepoint(s) indicating an operation of no PUSCH scheduling may be defined/configured, or such information may be jointly encoded with SRI/UL TCI (Embodiment 1-3). For example, the first N TCI codepoints may be configured to correspond to 'no PUSCH scheduling'. Alternatively, as an example of joint encoding, the value of the TCI codepoint may indicate a specific combination of elements of a set {spatial relation, PL RS, 'PUSCH scheduling or not'}. For example, when the TCI codepoint value is 000, the first spatial relation, the first PL RS, and no PUSCH scheduling may be indicated. Alternatively, when the TCI codepoint value is 001, it may indicate the first spatial relation, the first PL RS, and there being a PUSCH scheduling. Here, each bit value of the TCI codepoint may not correspond to each element.

Embodiment 1.1

In the case of Embodiment 1-2, which corresponds to a case that CSI reporting is triggered but there is no content (or quantity) to report, the terminal may perform CSI-RS-based measurement. Since the dynamic beam indication DCI is for beam update of the UE, CSI-RS-based measurement may be unnecessary. In order to prevent the terminal from performing such unnecessary measurement, as in the following examples, the associated CSI-RS resource set(s) may be deactivated.

Embodiment 1.1-1: A 1-bit indicator for deactivation of the associated CSI resource set(s) may be introduced into DCI.

Embodiment 1.1-2: UL TCI codepoint(s) indicating non-measured CSI-RS (resource) may be defined/configured, or the corresponding information may be jointly encoded.

For example, the first N TCI codepoints of the TCI field may be defined/configured to correspond to no CSI-RS or to ignore CSI-RS. Alternatively, as an example of joint encoding, the value of the TCI codepoint may indicate a specific combination of elements of a set {spatial relation, PL RS, CSI-RS/CSI report (trigger) or not}. For example, when the TCI codepoint value is 000, it may indicate the first spatial relation, the first PL RS, and the no CSI-RS/CSI report triggered. Alternatively, when the TCI codepoint value is 001, it may indicate that the first spatial relation, the first PL RS, and the CSI-RS/CSI report triggered. Here, each bit value of the TCI codepoint may not correspond to each element.

Embodiment 1.1-3: A separate RRC configuration may provided so that there is no association of the CSI-RS resource with the CSI reporting setting, or RRC configuration may be provided so that the CSI resource set is not included in the CSI resource setting associated with the CSI reporting setting.

In the above-described Embodiments 1 and 1.1 and detailed examples thereof for UL DCI for dynamic beam indication/update, the terminal may change/update the beam without PUSCH transmission. In this case, the base station may not know whether the terminal has successfully received the corresponding DCI, the terminal may be configured to send ACK (/NACK) information for the corresponding DCI/PDCCH to the base station.

As a method of transmitting the ACK/NACK (A/N) or HARQ-ACK information for the DCI/PDCCH, SRS transmission may be used/applied. That is, based on the SRS transmitted from the terminal by the SRS request included in the dynamic beam indication UL DCI, the base station may know whether the dynamic beam indication UL DCI has been successfully decoded by the terminal.

For example, when the UL-SCH is not configured/indicated and the CSI request field is non-zero (or not configured/indicated) (and/or CSI reporting setting with the reporting quantity corresponds to none is triggerd) in the UL-DCI, the base station may trigger a specific aperiodic SRS transmission through the SRS request field. The terminal may transmit to the base station information that the UL DCI for beam indication/update has been successfully received by transmitting a specific aperiodic SRS by the SRS triggering.

Additionally or alternatively, for aperiodic SRS triggered by UL DCI, by transmitting SRS for some bandwidth (e.g., the lowest half-bandwidth) among the configured SRS bandwidth, information (ACK) indicating that the UL DCI has been successfully received may be transmitted to the base station. In addition, by transmitting SRS for the remaining bandwidth (e.g., the highest half-bandwidth), information (NACK) indicating that the UL DCI has not been successfully received may be transmitted to the base station.

Additionally or alternatively, a CSI report triggered through dynamic beam indication/update UL DCI may be used for a purpose of A/N for the UL DCI. In this case, when a new report value with a small overhead such as a 1-bit indicator may be defined, and when the corresponding report value is received as a CSI report value, the base station many know that the UE has successfully decoded the UL DCI.

Embodiment 2

This embodiment is related to DL DCI for dynamic beam indication/update. The base station may configure DL DCI according to examples described below and transmit it to the terminal. The terminal may apply a beam indication or perform a beam update according to an indication by the corresponding DCI without PDSCH scheduling/reception.

For example, in the case of DL DCI for dynamic beam (or TCI state) indication/update, PDSCH scheduling may be disabled, or PDSCH scheduling information may be ignored.

Embodiment 2-1: A value corresponding to no resource allocation (no RA) or void may be defined in the time domain resource allocation (TDRA) field and/or the frequency domain resource allocation (FDRA) field in the DCI, and the value may be activated.

Embodiment 2-2: A value corresponding to no resource allocation (no RA) or void may be defined in the TCI field in DCI, and the value may be configured/indicated.

Embodiment 2-3: When the TCI field in DCI indicates a codepoint corresponding to reserved or non-activated, the terminal may interpret that as no PDSCH scheduling.

Embodiment 2-4: For TCI state codepoint(s) for PDSCH activated through MAC-CE, a specific TCI state codepoint(s) corresponding to no PDSCH scheduling may be defined, and when the specific TCI state codepoint(s) is indicated through DCI, the UE may interpret that as no PDSCH scheduling.

For Embodiment 2 and detailed examples, in order for the base station to check whether the terminal has successfully received the dynamic beam indication DL DCI, A/N information for the dynamic beam indication DL DCI (or for the PDCCH carrying the DCI) may be transmitted by the terminal. Here, A/N for DCI/PDCCH is distinguished from A/N for PDSCH. That is, although there is no PDSCH scheduled through DCI, the terminal may transmit A/N for DCI/PDCCH instead of PDSCH. Corresponding A/N information may be generated as a HARQ-ACK bit. The generated HARQ-ACK bit may be transmitted from the terminal to the base station in the form of a HARQ-ACK codebook.

The HARQ-ACK bit for the DCI/PDCCH may be reported to the base station through the PUCCH resource when there is a PUCCH resource indicated by the PRI field in the DL DCI. Here, the PUCCH transmission timing may not be based on the PDSCH reception timing (e.g., the last reception slot of the PDSCH), but may be based on the timing at which the PDCCH carrying the dynamic beam indication DL DCI is received. For example, based on the slot n where the PDCCH carrying the dynamic beam indication DL DCI ends, HARQ-ACK information may be transmitted to the base station (on the PUCCH resource) in the slot n+k.

As above, for HARQ-ACK information transmission for dynamic beam indication DL DCI, a specific HARQ process ID may be allocated for that purpose. A field indicating the HARQ process ID (or HARQ processor number (HPN)) may be included in the DL DCI. For example, a new HARQ process ID in addition to IDs of existing HARQ processes may be allocated for ACK information transmission for dynamic beam indication DL DCI. For example, one or more of the ID candidates of the existing HARQ process may be allocated for HARQ-ACK information transmission for the dynamic beam indication DL DCI.

For transmitting the A/N or HARQ-ACK information for the DCI/PDCCH, SRS transmission may be used/applied. That is, based on the SRS transmitted from the terminal by the SRS request included in the dynamic beam indication DL DCI, the base station may know whether the dynamic beam indication DL DCI is successfully decoded by the terminal.

For example, the SRS request field included in the dynamic beam indication/update DL DCI may trigger a specific aperiodic SRS transmission. By transmitting the specific aperiodic SRS, the terminal may transmit to the base station information indicating that it has successfully received (or decoded) the DL DCI for dynamic beam indication/update.

Additionally or alternatively, for aperiodic SRS triggered by DL DCI, by transmitting SRS for some bandwidth (e.g., the lowest half-bandwidth) among the configured SRS bandwidth, information (ACK) indicating that the DL DCI has been successfully received may be transmitted to the base station. In addition, the SRS may be transmitted for the remaining bandwidth (e.g., the highest half-bandwidth), and information (NACK) indicating that the DL DCI has not been successfully received may be transmitted to the base station.

Such SRS transmitted for the purpose of A/N indication for dynamic beam indication DCI/PDCCH may be transmitted based on SRS timing or may be transmitted based on A/N PUCCH timing. The SRS timing may mean a preconfigured periodic/semi-persistent/aperiodic SRS transmission timing. SRS transmission based on A/N PUCCH timing may mean that, at the time when A/N PUCCH is transmitted, SRS is multiplexed with A/N PUCCH and transmitted, or SRS is transmitted instead of A/N PUCCH (or with higher priority than A/N PUCCH).

As in the above-described Embodiment 2-1, for the resource allocation type indicated by the TDRA and/or FDRA in the DL DCI, no resource allocation (no RA) or void may be defined in addition to the existing resource allocation type. When the value of the TDRA and/or FDRA field in the DL DCI indicates no RA or void, the DL DCI indicates that the DL DCI is the DCI for the purpose of indicating/updating a dynamic beam (or TCI state), and the UE may recognize it. That is, when at least one of TDRA or FDRA in DL DCI indicates a predefined state (e.g., a state corresponding to no RA or void), the UE may disable/ignore PDSCH scheduling based on the corresponding DL DCI.

With respect to the TDRA field in the DL DCI, when the HARQ-ACK codebook is configured as semi-static or type-1, the position of the ACK information bit in the HARQ-ACK codebook may be determined based on the TDRA. Therefore, when the TDRA is indicated as no RA or void, the HARQ-ACK feedback scheme may be affected. Therefore, for TDRA, a state indicating dynamic beam indication/ update DL DCI (or indicating that PDSCH is not scheduled) may not be defined. Accordingly, in the HARQ-ACK feedback scheme, the position of the ACK information for the DL DCI in the HARQ-ACK codebook may be determined based on the TDRA in the DL DCI. For example, the TDRA in the DL DCI indicates a specific resource, but at least one other field in the DL DCI indicates that the DL DCI is dynamic beam indication/update DL DCI (or indicates that the PDSCH is not scheduled), it may be interpreted that the PDSCH does not actually exist (or that a virtual PDSCH exists) at the position indicated by the TDRA.

Examples of forming a DCI parameter (or a value of a field in DCI) indicating dynamic beam indication/update DL DCI (or indicating that PDSCH is not scheduled) will be described. One of the following examples may be applied, or a combination of two or more may be applied.

For example, when FDRA in the DCI has a specific value indicating the state of no RA or void, the DCI may correspond to DCI indicating that it is dynamic beam indication/update DL DCI (or indicating that the PDSCH is not scheduled).

Additionally or alternatively, when the MCS indicator in the DCI has a specific value, the DCI may correspond to DCI indicating that it is dynamic beam indication/update DL DCI (or indicating that PDSCH is not scheduled).

Additionally or alternatively, when the RV indicator in the DCI has a specific value, the DCI may correspond to DCI indicating that it is dynamic beam indication/update DL DCI (or indicating that PDSCH is not scheduled).

For example, when the MCS indicator (e.g., I_MCS) value is 26 and the RV ID is 1, it may indicate that a transport block (TB) allocated by the corresponding DCI is disabled. One TB or two TBs may be allocated by DCI. When one TB or both TBs allocated by DCI are disabled, the DCI may correspond to DCI indicating that it is dynamic beam indication/update DL DCI (or indicating that PDSCH is not scheduled).

Additionally or alternatively, when the NDI field in the DCI has a specific value, the DCI may correspond to DCI indicating that it is dynamic beam indication/update DL DCI (or indicating that PDSCH is not scheduled).

For example, when the NDI in the DCI indicates the transmission or reception of new data (that is, the NDI is toggled compared to the previous value), and the MCS indicates a reserved state corresponding to the retransmission, the DCI may correspond to DCI indicating that it is dynamic beam indication/update DL DCI (or indicating that PDSCH is not scheduled).

As described above, when each of at least one field of FDRA, RV, MCS, NDI, or HPN in DCI has a specific (e.g., the same or different) value respectively, the DCI may correspond to DCI indicating that it is dynamic beam indication/update DL DCI (or indicating that PDSCH is not scheduled). In addition, by a combination in addition to the FDRA, RV, MCS, and NDI (or FDRA, RV, MCS, NDI, and HPN) fields in the DCI, with another field or a plurality of other fields in the DCI, the DCI may correspond to DCI indicating that it is dynamic beam indication/update DL DCI (or indicating that PDSCH is not scheduled).

The method indicating that the corresponding DL DCI is dynamic beam indication/update DL DCI (or indicating that the PDSCH is not scheduled) based on the various field(s) in the DL DCI as described above, may also applied to the UL DCI. For example, based on at least one of FDRA, RV, MCS, NDI, HPN or other field(s) in the UL DCI, the UL DCI may be indicated as dynamic beam indication/update UL DCI (or that the PUSCH is not scheduled).

Additionally or alternatively, when a new TCI state pool associated with a beam indication field (e.g., TCI field) in DCI is activated, the DCI may be indicated as dynamic beam indication/update DCI (or as the data channel is not scheduled). In this case, instead of indicating the beam to be changed/updated by the state of the existing TCI field in the DCI, an X-bit of another field in the DCI (e.g., an antenna port field) may be used/interpreted as indicating a specific TCI state of the new TCI state pool. For example, an additional new TCI state pool other than the existing 128 TCI state pool may be RRC configured and activated by MAC CE. When the new TCI state pool is activated, the antenna port field in DCI may indicate the TCI state in the new TCI state pool. Alternatively, when the new TCI state pool is not activated, the TCI state field in DCI may indicate the TCI state in the existing TCI state pool.

Additionally or alternatively, when a plurality of CORESET pool indexes are configured, a new TCI state pool may be configured for each CORESET pool index.

Additionally or alternatively, a specific state of the TCI field in DCI may indicate that the DCI is dynamic beam indication/update DCI (or indicate that a data channel is not scheduled). When the TCI field indicates the specific state, the terminal may apply the dynamic beam indication or update the beam without data channel transmission/reception (Embodiment 2-2). Alternatively, it may be configured that, for the TCI codepoint(s) mapped to a specific state indicated by the TCI field, the data channel it not scheduled (Embodiment 2-3).

For example, the first N TCI codepoint(s) of the TCI field may be defined/configured to correspond to no data channel (e.g., no PDSCH) or ignore RA. Alternatively, as an example of joint encoding, the value of the TCI codepoint may indicate a specific combination of elements of a set {spatial relation, PL RS, PDSCH scheduling or not}. For example, when the TCI codepoint value is 000, it may indicate the first spatial relation, the first PL RS, and no PDSCH scheduling. Alternatively, when the TCI codepoint value is 001, it may indicate the first spatial relation, the first PL RS, and PDSCH scheduling. Here, each bit value of the TCI codepoint may not correspond to each element.

According to Embodiment 2-4, dynamic beam indication/update may be supported through TCI state codepoint update/activation through MAC CE. For example, a specific TCI state codepoint indicating dynamic beam indication/update may be activated by the MAC CE. Before the MAC CE for activating the specific TCI codepoint is configured/indicated to the terminal, the terminal may be indicated with a beam for PDSCH scheduling and corresponding PDSCH reception based on DCI. When the MAC CE for activating the specific TCI codepoint is configured/indicated to the terminal, the terminal may dynamically change/update beams for (all) UL/DL channels/signals of the terminal without PDSCH scheduling based on DCI.

According to Embodiment 2-2, DCI may be may consistently indicated that it is dynamic beam indication/update DL DCI (or indicate that PDSCH is not scheduled) by a specific state of one or more field(s) in the DL DCI, while according to Embodiment 2-4, an existing operation (i.e., DCI indicates PDSCH scheduling and a TCI state for receiving the corresponding PDSCH) and a new operation according to the present disclosure (i.e., DCI does not schedule PDSCH and dynamically indicates beam) may be distinguished and applied through MAC CE for activating a specific TCI codepoint. In addition, a flexibility may be supported such as securing more number of available codepoints in the TCI state field used for the PDSCH beam indication before receiving the MAC CE for activating a specific TCI codepoint.

Embodiment 3

According to the present embodiment, the DL DCI may schedule the PDSCH for dynamic beam indication/update, but a specific sequence (or data) instead of the TB may be transmitted through the scheduled PDSCH. A specific sequence may be preconfigured/pre-indicated between the base station and the terminal, or may be predefined without signaling between the base station and the terminal.

The terminal may transmit HARQ-ACK information for the PDSCH including the specific sequence, and apply the dynamic beam indication or update the beam based on the beam indicator (e.g., TCI state) included in the DL DCI scheduling the PDSCH.

For HARQ-ACK information transmission for the PDSCH (i.e., PDSCH including a specific sequence) scheduled by the dynamic beam indication DL DCI as described above, a specific HARQ process ID may be allocated for that purpose. For example, a field indicating a HARQ process ID or a HARQ process number (HPN) may be included in the DL DCI. For example, in addition to IDs of existing HARQ processes, a new HARQ process ID may be allocated for transmission of HARQ-ACK information for a PDSCH scheduled by dynamic beam indication DL DCI. For example, one or more of the ID candidates of the existing HARQ process may be allocated for transmission of HARQ-ACK information for a PDSCH scheduled by the dynamic beam indication DL DCI.

Unlike Embodiments 1 and 2 in which DL/UL DCI for dynamic beam indication/update does not schedule PDSCH/PUSCH, in Embodiment 3, DL DCI for dynamic beam indication/update may schedule PDSCH. Here, unlike the PDSCH scheduled by the general DL DCI that carries data (or TB) delivered to the terminal, the PDSCH scheduled by the DL DCI for dynamic beam indication/update may carry only a specific sequence, or include a specific sequence (i.e., carry a specific sequence and other data). The specific sequence may be a sequence having a predetermined size (e.g., length L) (e.g., a sequence in which all bits of length L are 0). When the terminal receives a PDSCH including a specific sequence, the terminal may transmit HARQ A/N for the corresponding PDSCH.

In the case of Embodiment 3, it is not required to newly design the HARQ-ACK feedback scheme for DCI/PDCCH for dynamic beam indication/update, and the HARQ-ACK feedback scheme based on the existing PDSCH reception timing may be applied as it is. However, in the case of Embodiment 3, since PDSCH scheduling/allocation is involved, the overhead and delay may be larger than in Embodiments 1 and 2 which do not involve PDSCH/PUSCH scheduling/allocation.

PDSCH scheduled by DL DCI for dynamic beam indication/update may include beam indication information in addition to the specific sequence. Accordingly, dynamic beam indication/update may be performed using a fallback DCI (e.g., DCI format 1_0) that does not include a beam indication field (e.g., a TCI field) as well as a non-fallback DCI format (e.g., DCI format 1_1, 1_2, etc.) including a beam indication field (e.g., TCI field) in DCI.

For example, through a specific HARQ process ID (e.g., when the HPN field in the DL DCI has a specific value), terminal may be informed that the fallback DL DCI is for the purpose of dynamic beam indication/update. Additionally or alternatively, instead of (or in addition to) the HARQ process ID or HARQ process number, in combination with other fields such as FDRA, RV, MCS, NDI, etc. having a specific value, the terminal may be informed that the corresponding DL DCI is for a purpose of a dynamic beam indication/update. By including a specific sequence and beam indication information in the PDSCH scheduled by the fallback DL DCI, dynamic beam indication may be applied to the UE.

For example, the length of the specific sequence is 8-bit, and a specific TCI state may be indicated by the bit value of the specific sequence among the activated TCI states. That is, a mapping relationship between bit values of a specific sequence and TCI state candidates may be configured. For example, when the bit value of the specific sequence is 00000001, the lowest TCI state among the activated DL TCI states may be indicated, and dynamic beam indication application or beam update may be performed at the terminal based on the indicated lowest TCI state, and HARQ-ACK feedback for the PDSCH may be transmitted.

Figure 16:
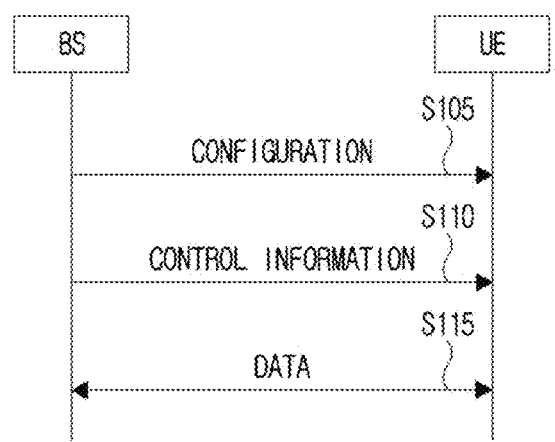
FIG. 16 is a diagram for illustrating a signaling process according to an embodiment of the present disclosure.

FIG. 16 is a diagram for illustrating a signaling process according to an embodiment of the present disclosure.

The example of FIG. 16 shows an example of signaling between a base station and a terminal (UE) to which FIG. 15, Embodiments 1, 2, 3 and/or detailed examples thereof may be applied. Here, the UE/base station is just an example, and it may be substituted for various devices as described in FIG. 17. The base station may correspond to one base station including a plurality of TRPs or one cell including a plurality of TRPs. FIG. 16 is for convenience of description, and does not limit the scope of the present disclosure. Also, some step(s) shown in FIG. 16 may be omitted depending on circumstances and/or settings. In addition, in the operation of the base station/UE of FIG. 16, the above-described beam management and uplink/downlink transmission/reception operations may be referenced/used.

The UE may receive configuration information from the base station (S105). The configuration may include system information (SI), scheduling information, beam management (BM) related settings (e.g., DL BM related CSI-ResourceConfig IE, NZP CSI-RS resource set IE, etc.), and/or the configuration related to the base station (e.g., TRP configuration) information and the like. For example, the configuration includes information related to reconfiguration/update of RS information for spatial relation (e.g., QCL relation) assumption (e.g., information related to indication/timing of whether reconfiguration/update being performed, etc.). The configuration may be transmitted through higher layer (e.g., RRC or MAC CE). In addition, when the configuration information is predefined or preconfigured, the corresponding step may be omitted.

For example, based on the above-described examples of FIG. 15, Embodiments 1, 2, 3 and/or detailed examples thereof, the configuration may include information on TCI state(s), QCL RS(s), and/or DMRS port(s). For example, the TCI state may include RS information for spatial relation (e.g., QCL relation) assumption. For example, the configuration may include QCL-related configuration information for a DL channel (e.g., PDCCH/PDSCH)/a UL channel (e.g., PUSCH/PUCCH). For example, the configuration may include information indicating change/update for QCL-related information (or RS information for spatial relation assumption, etc.) of a downlink channel (e.g., PDCCH/PDSCH).

For example, the operation of receiving the configuration, by the UE (100/200 in FIG. 17), from the base station (200/100 in FIG. 17) in the above-described step S105 may be implemented by the apparatus of FIG. 17 to be described below. For example, referring to FIG. 17, one or more processors 102 may control one or more transceivers 106 and/or one or more memories 104, etc. to receive the configuration, and one or more transceivers 106 may receive the configuration from the base station.

The UE may receive control information from the base station (S110). The control information may be received through a control channel (e.g., PDCCH). For example, the control information may be DL DCI/UL DCI. For example, the control information may include scheduling information of a downlink data channel (e.g., PDSCH)/an uplink channel (e.g., PUCCH/PUSCH) and the like. For example, based on the above-described examples of FIG. 15, Embodiments 1, 2, 3 and/or detailed examples thereof, the control information may include information on TCI state(s), QCL RS(s), and/or DMRS port(s). For example, one or more TCI states may be indicated for DMRS port(s) related to a DL data channel (e.g., PDSCH)/UL channel (e.g., PUCCH/PUSCH) may be configured for the TCI state field in the control information (e.g., DCI). For example, the TCI state may include RS information for spatial relation (e.g., QCL relation) assumption.

For example, the operation of receiving the control information, by the UE (100/200 in FIG. 17), from the base station (200/100 in FIG. 17) in the above-described step S110 may be implemented by the apparatus of FIG. 17 to be described below. For example, referring to FIG. 17, one or more processors 102 may control one or more transceivers 106 and/or one or more memories 104, etc. to receive the control information, and one or more transceivers 106 may receive the control information from the base station.

Although not shown in FIG. 16, the UE may transmit HARQ-ACK information for control information (DL DCI/UL DCI) or a channel (e.g., PDCCH) carrying the control information. For example, when the control information is DCI for dynamic spatial parameter indication (e.g., when the third information indicates no data channel scheduling in the example of FIG. 15), after transmitting HARQ-ACK information for the corresponding DCI (e.g., after transmitting HARQ-ACK information according to the position of ACK information in the HARQ-ACK codebook determined based on the second information in the example of FIG. 15), after a predetermined time, the UE may be perform data transmission/reception (S115) to be described later based on a spatial parameter (e.g., a spatial parameter determined based on the first information in the example of FIG. 15) indicated by the corresponding DCI. That is, the UE may report to the base station whether the spatial parameter of the UL/DL channel/signal has been changed/updated based on the dynamic spatial parameter indication DCI.

The UE may receive data from the base station or transmit data to the base station (S115). The data may be received through a downlink channel (e.g., PDCCH/PDSCH) or transmitted through an uplink channel (e.g., PUCCH/PUSCH). For example, the data may be scheduled based on the control information or may be scheduled based on separate control information not shown in FIG. 16.

In addition, the data may be transmitted/received based on the information configured/indicated in steps S105/S110. For example, based on the information configured/indicated in steps S105/S110, the UE may perform channel estimation/compensation and may transmit/receive the data. For example, based on the above-described examples of FIG. 15, Embodiments 1, 2, 3 and/or detailed examples thereof, a spatial relation-related RS (e.g., QCL type D RS) for receiving the data may be configured.

For example, based on spatial relation information of an uplink channel (e.g., PUCCH/PUSCH) transmitted by the UE, a spatial relation-related RS (e.g., QCL type D RS) for receiving the data (of downlink channel) may be configured/changed. For example, based on the usage/contents (e.g., SR/HARQ-ACK/CSI, etc.) of the uplink channel, a spatial relation-related RS (e.g., QCL type D RS) for receiving the data (of the downlink channel) may be configured. For example, the spatial relation-related RS (e.g., QCL type D RS) for receiving the data (of downlink channel) may be configured/updated/changed for each CORESET/SS. For example, it may be determined whether to apply the QCL RS indicated by the TCI or to follow the spatial relation information of the uplink channel, based on whether the inclusion/existence of the TCI field in the DCI.

For example, based on spatial relation information of an uplink channel (e.g., PDCCH/PDSCH) transmitted by the UE, a spatial relation-related RS (e.g., QCL type D RS) for receiving the data (of downlink channel) may be configured/changed. For example, based on the usage/contents (e.g., SR/HARQ-ACK/CSI, etc.) of the downlink channel, a spatial relation-related RS (e.g., QCL type D RS) for transmitting the data (of the uplink channel) may be configured. For example, the spatial relation-related RS (e.g., QCL type D RS) for transmitting the data (of uplink channel) may be configured/updated/changed for each CORESET/SS. For example, it may be determined whether to apply the QCL RS indicated by the TCI or to follow the spatial relation information of the downlink channel, based on whether the inclusion/existence of the TCI field in the DCI.

For example, the operation of transmitting/receiving the data, by the UE (100/200 in FIG. 17), to/from the base station (200/100 in FIG. 17) in the above-described step S115 may be implemented by the apparatus of FIG. 17 to be described below. For example, referring to FIG. 17, one or more processors 102 may control one or more transceivers 106 and/or one or more memories 104, etc. to transmit/receive the data, and one or more transceivers 106 may transmit/receive the data to/from the base station.

As mentioned above, the above-described base station/UE signaling and operation (e.g., examples of FIG. 15, Embodiments 1, 2, 3 and/or detailed examples thereof) may implemented by the apparatus of FIG. 17 to be described below. For example, the base station (e.g., TRP 1/TRP 2) may correspond to the first wireless device, the UE may correspond to the second wireless device, and vice versa may be considered in some cases.

Figure 17:
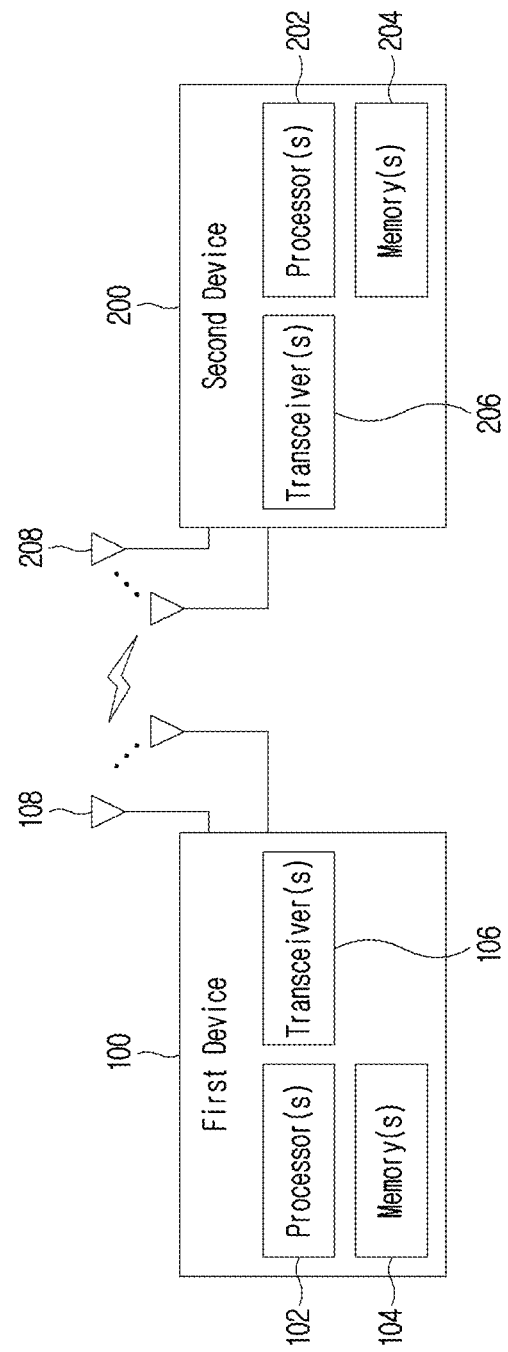
FIG. 17 is a diagram which illustrates a block diagram of a wireless communication device according to an embodiment of the present disclosure.

For example, the base station/UE signaling and operation (e.g., examples of FIG. 15, Embodiments 1, 2, 3 and/or detailed examples thereof) described above may be processed by one or more processors (e.g., 102, 202) of FIG. 17, and the above-described base station/UE signaling and operation (e.g., examples of FIG. 15, Embodiments 1, 2, 3 and/or detailed examples thereof) may be stored in a memory (e.g., one or more memories 104 and 204 of FIG. 17) in the form of an instruction/program (e.g., instruction, executable code) for driving at least one processor of FIG. 17 (e.g., 102 and 202).

General Device to which the Present Disclosure May be Applied

FIG. 17 illustrates a block diagram of a wireless communication device according to an embodiment of the present disclosure.

In reference to FIG. 17, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method performed by a terminal in a wireless communication system, the method comprising:
   receiving, from a base station, downlink control information (DCI) including first information related to at least one transmission configuration indication (TCI) state, second information related to time domain resource assignment, and third information related to a physical uplink control channel (PUCCH) resource indication, the DCI being with or without scheduling a physical downlink shared channel (PDSCH);

transmitting, to the base station, hybrid automatic repeat request-acknowledgement (HARQ-ACK) information, based on the DCI without scheduling the PDSCH; and applying the at least one TCI state based on the first information, after transmitting the HARQ-ACK information, wherein the HARQ-ACK information corresponds to a detection of the DCI providing an update of the at least one TCI state without scheduling the PDSCH, and wherein the DCI without scheduling the PDSCH is based on a specific value of at least one of frequency domain resource assignment (FDRA) field, redundancy version (RV) field, modulation and coding scheme (MCS) field, or new data indicator (NDI) field of the DCI.

2. The method according to claim 1, wherein:
a location of the HARQ-ACK information in an HARQ-ACK codebook is based on the second information.

3. The method according to claim 2, wherein:
the HARQ-ACK codebook is configured as Type-1 or semi-static.

4. The method according to claim 1, wherein:
for the DCI without scheduling the PDSCH, each the of at least one of the FDRA field, the RV field, the MCS field, or the NDI field is individually set to a specific value.

5. The method according to claim 1, wherein:
the first information indicates at least one of at least one uplink TCI state or at least one downlink TCI state.

6. The method according to claim 1, wherein:
the at least one TCI state based on the first information is applied to the terminal after transmitting the HARQ-ACK information corresponding to the DCI providing the update of the at least one TCI state without scheduling the PDSCH.

7. The method according to claim 1, wherein:
an uplink transmission to the base station is performed based on the at least one TCI state based on the first information, the uplink transmission includes a transmission of at least one of a physical uplink control channel (PUCCH), a physical uplink shared channel (PUSCH), or a sounding reference signal (SRS), a downlink reception from the base station is performed based on the at least one TCI state based on the first information, the downlink reception includes a reception of at least one of a physical downlink control channel (PDCCH), a physical downlink shared channel (PDSCH), or a channel state information-reference signal (CSI-RS).

8. The method according to claim 1, wherein:
the DCI is based on a DCI format 1_1 or 1_2.

9. A terminal comprising:
at least one transceiver; and
at least one processor connected to the at least one transceiver,
wherein the at least one processor is configured to:
receive, from a base station through the transceiver, downlink control information (DCI) including first information related to at least one transmission configuration indication (TCI) state, second information related to time domain resource assignment, and third information related to a physical uplink control channel (PUCCH) resource indication, the DCI being with or without scheduling a physical downlink shared channel (PDSCH);

transmit, to the base station through the transceiver, hybrid automatic repeat request-acknowledgement (HARQ-ACK) information, based on the DCI without scheduling the PDSCH; and apply the at least one TCI state based on the first information, after transmitting the HARQ-ACK information, wherein the HARQ-ACK information corresponds to a detection of the DCI providing an update of the at least one TCI state without scheduling the PDSCH, and wherein the DCI without scheduling the PDSCH is based on a specific value of at least one of frequency domain resource assignment (FDRA) field, redundancy version (RV) field, modulation and coding scheme (MCS) field, or new data indicator (NDI) field of the DCI.

10. A base station comprising:
at least one transceiver; and
at least one processor connected to the at least one transceiver,
wherein the at least one processor is configured to:
transmit, to a terminal through the transceiver, downlink control information (DCI) including first information related to at least one transmission configuration indication (TCI) state, second information related to time domain resource assignment, and third information related to a physical uplink control channel (PUCCH) resource indication, the DCI being with or without scheduling a physical downlink shared channel (PDSCH); and receive, from the terminal through the transceiver, hybrid automatic repeat request-acknowledgement (HARQ-ACK) information, based on the DCI without scheduling the PDSCH;

wherein the at least one TCI state is applied to the terminal based on the first information, after transmitting the HARQ-ACK information, and wherein the HARQ-ACK information corresponds to a detection of the DCI providing an update of the at least one TCI state without scheduling the PDSCH, and wherein the DCI without scheduling the PDSCH is based on a specific value of at least one of frequency domain resource assignment (FDRA) field, redundancy version (RV) field, modulation and coding scheme (MCS) field, or new data indicator (NDI) field of the DCI.

* * * * *